United States Patent
Hamada et al.

(10) Patent No.: US 10,638,023 B2
(45) Date of Patent: Apr. 28, 2020

(54) IMAGE PROCESSING APPARATUS AND IMAGE PROCESSING METHOD

(71) Applicant: SONY CORPORATION, Tokyo (JP)

(72) Inventors: Toshiya Hamada, Saitama (JP); Kenichi Kanai, Tokyo (JP)

(73) Assignee: Sony Corporation, Tokyo (JP)

( * ) Notice: Subject to any disclaimer, the term of this patent is extended or adjusted under 35 U.S.C. 154(b) by 30 days.

(21) Appl. No.: 15/759,686

(22) PCT Filed: Aug. 2, 2016

(86) PCT No.: PCT/JP2016/072691
§ 371 (c)(1),
(2) Date: Mar. 13, 2018

(87) PCT Pub. No.: WO2017/051612
PCT Pub. Date: Mar. 30, 2017

(65) Prior Publication Data
US 2019/0045091 A1 Feb. 7, 2019

(30) Foreign Application Priority Data

Sep. 25, 2015 (JP) .................. 2015-188348

(51) Int. Cl.
*H04N 5/202* (2006.01)
*G09G 5/10* (2006.01)
(Continued)

(52) U.S. Cl.
CPC .............. *H04N 5/202* (2013.01); *G09G 3/20* (2013.01); *G09G 5/10* (2013.01); *H04N 19/70* (2014.11);
(Continued)

(58) Field of Classification Search
CPC ...... H04N 5/202; H04N 5/2355; H04N 19/70; G09G 3/20; G09G 5/10; G09G 2320/0673;
(Continued)

(56) References Cited

U.S. PATENT DOCUMENTS

2007/0139678 A1 6/2007 Horita
2011/0169881 A1 7/2011 Wallener et al.
(Continued)

FOREIGN PATENT DOCUMENTS

CA 2736270 A1 4/2010
CN 102165513 A 8/2011
(Continued)

OTHER PUBLICATIONS

International Search Report and Written Opinion of PCT Application No. PCT/JP2016/072691, dated Nov. 8, 2016, 09 pages.
(Continued)

*Primary Examiner* — Allen C Wong
(74) *Attorney, Agent, or Firm* — Chip Law Group

(57) ABSTRACT

To resolve or at least reduce trouble related to mismatch between a dynamic range of an HDR video signal and peak luminance of a display. Provided is an image processing apparatus including: a transformation unit configured to transform image signals based on a signal scheme of fixedly handling a display luminance level of reference white into display signals by executing gamma transformation so that the display luminance level of the reference white is maintained using a parameter decided on a basis of a peak luminance level of a display.

16 Claims, 26 Drawing Sheets

(51) Int. Cl.
*H04N 19/70* (2014.01)
*G09G 3/20* (2006.01)
*H04N 5/235* (2006.01)

(52) U.S. Cl.
CPC .............. *G09G 2320/0276* (2013.01); *G09G 2320/0626* (2013.01); *G09G 2320/0673* (2013.01); *G09G 2360/16* (2013.01); *H04N 5/2355* (2013.01)

(58) Field of Classification Search
CPC ... G09G 2320/0626; G09G 2320/0276; G09G 2360/16
USPC .................................................... 375/240.26
See application file for complete search history.

(56) References Cited

U.S. PATENT DOCUMENTS

| 2013/0251258 | A1* | 9/2013 | Umeda | H04N 9/643 382/167 |
|---|---|---|---|---|
| 2014/0210847 | A1 | 7/2014 | Knibbeler et al. | |
| 2014/0225941 | A1 | 8/2014 | Van Der Vleuten et al. | |
| 2014/0333684 | A1* | 11/2014 | Marcu | G09G 3/20 345/690 |
| 2016/0165256 | A1* | 6/2016 | Van Der Vleuten | G09G 5/10 375/240.01 |

FOREIGN PATENT DOCUMENTS

| EP | 2329487 | A1 | 6/2011 |
|---|---|---|---|
| EP | 2745290 | A1 | 6/2014 |
| EP | 2745507 | A1 | 6/2014 |
| JP | 2006-215756 | A | 8/2006 |
| JP | 2007-163979 | A | 6/2007 |
| JP | 2012-504259 | A | 2/2012 |
| JP | 2014-531821 | A | 11/2014 |
| JP | 2014-532195 | A | 12/2014 |
| JP | 2015-84101 | A | 4/2015 |
| KR | 10-2011-0067138 | A | 6/2011 |
| MX | 2011003349 | | 6/2011 |
| WO | 2010/039440 | A1 | 4/2010 |
| WO | 2013/046095 | A1 | 4/2013 |
| WO | 2013/046096 | A1 | 4/2013 |

OTHER PUBLICATIONS

"Philips HDR Technology—White Paper", Philips International B.V., Version 0.1, Aug. 21, 2015, 11 pages.

"Essential Parameter Values for the Extended Image Dynamic Range Television (EIDRTV) System for Programme Production", ARIB STD-B67, Version 1.0, Jul. 3, 2015, 15 pages.

"High Dynamic Range Electro-Optical Transfer Function of Mastering Reference Displays", SMPTE Standard, 2014, 14 pages.

\* cited by examiner

IMAGE PROCESSING APPARATUS AND IMAGE PROCESSING METHOD

CROSS REFERENCE TO RELATED APPLICATIONS

This application is a U.S. National Phase of International Patent Application No. PCT/JP2016/072691 filed on Aug. 2, 2016, which claims priority benefit of Japanese Patent Application No. JP 2015-188348 filed in the Japan Patent Office on Sep. 25, 2015. Each of the above-referenced applications is hereby incorporated herein by reference in its entirety.

TECHNICAL FIELD

The present disclosure relates to an image processing apparatus and an image processing method.

BACKGROUND ART

At present, discussion about extension of a luminance dynamic range of a video signal from the known standard dynamic range (SDR) is ongoing in the International Telecommunication Union-Radio (ITU-R) communications sector. The extended dynamic range is called extended image dynamic range television (EIDRTV) or more simply a high dynamic range (HDR). In the recent status of ITU-R, two schemes, Application-1 and Application-2, are expected to be included as signal schemes for HDR video signals in recommendation.

Application-1 is a signal scheme based on Perceptual Quantizer (PQ)-Electro-Optical Transfer Function (EOTF) for the purpose of expressing absolute values of luminance of imaging environments (see Non-Patent Literature 1). Application-2 is a signal scheme of expressing relative luminance levels using a hybrid log-gamma (HLG) curve in which a gamma curve at a luminance level lower than the reference white and a logarithmic curve at a luminance level higher than the reference white are combined (see Non-Patent Literature 2). In Application-1, absolute luminance of a maximum of 10000 cd/m$^2$ can be expressed. On the other hand, in Application-2, relative luminance of a maximum of 12 times the reference white (20 times in a case in which headroom is used) can be expressed.

ITU-R Application-1 is the same scheme as ST2084 formulated by the Society of Motion Picture and Television Engineers (SMPTE) which is a different standardization organization from ITU-R. There are also other signal schemes similar to SMPTE ST2084 (see Non-Patent Literature 3).

CITATION LIST

Non-Patent Literature

Non-Patent Literature 1: Society of Motion Picture and Television Engineers, "High Dynamic Range Electro-Optical Transfer Function of Mastering Reference Displays," ST2084:2014, 2014, [online], [searched on Sep. 9, 2015], Internet <URL:http://standards.smpte.org/content/978-1-61482-829-7/st-2084-2014/SEC1>

Non-Patent Literature 2 Association of Radio Industries and Businesses. "ESSENTIAL PARAMETER VALUES FOR THE EXTENDED IMAGE DYNAMIC RANGE TELEVISION (EIDRTV) SYSTEM FOR PROGRAMME PRODUCTION ARIB STANDARD," ARIB STD-B67 Version 1.0, Jul. 3, 2015, [online], [searched on Sep. 9, 2015], Internet <URL:http://www.arib.or.jp/english/html/overview/doc/2-STD-B67v1_0.pdf>

Non-Patent Literature 3: Philips International B.V., "Philips HDR technology-white paper, hdr," Version 0.1, 2015-08-21 [online], [searched on Sep. 9, 2015], Internet <URL: http://www.ip.philips.com/data/downloadables/1/9/7/9/philips_hdr_white_paper.pdf>

DISCLOSURE OF INVENTION

Technical Problem

However, peak luminance of a display is often different from the upper limit of the luminance dynamic range of the HDR signal scheme. In a case in which luminance of one or more pixels included in a video signal exceeds peak luminance of a display, so-called halation occurs as a clipping result in a reproduced video. In a case in which the maximum luminance is less than a peak luminance of a display, the maximum performance of the display is not utilized. One simple method of resolving such mismatch between ranges is to adjust a luminance level through gain multiplication. However, the simple gain multiplication may change even a luminance level of a reference point which is to be fixedly handled.

Accordingly, it is desirable to provide a new structure resolving or at least reducing the above-described trouble related to the mismatch between a dynamic range of an HDR video signal and peak luminance of a display.

Solution to Problem

According to the present disclosure, there is provided an image processing apparatus including: a transformation unit configured to transform image signals based on a signal scheme of fixedly handling a display luminance level of reference white into display signals by executing gamma transformation so that the display luminance level of the reference white is maintained using a parameter decided on a basis of a peak luminance level of a display.

In addition, according to the present disclosure, there is provided an image processing method performed by an image processing apparatus, the method including: transforming image signals based on a signal scheme of fixedly handling a display luminance level of reference white into display signals by executing gamma transformation so that the display luminance level of the reference white is maintained using a parameter decided on a basis of a peak luminance level of a display.

Advantageous Effects of Invention

According to the technology according to the present disclosure, it is possible to resolve or at least reduce trouble related to mismatch between a dynamic range of an HDR video signal and peak luminance of a display.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
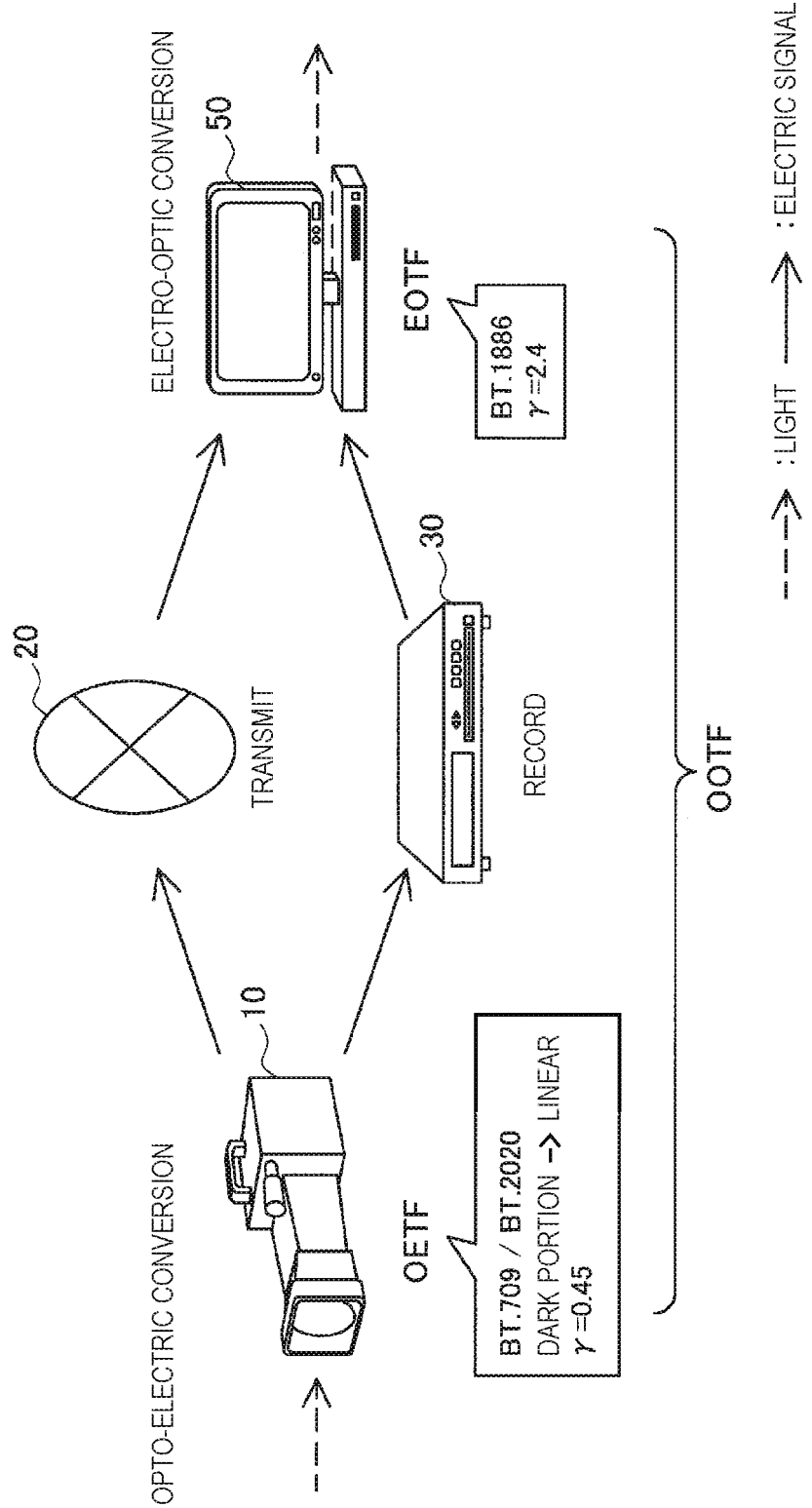
FIG. 1 is an explanatory diagram illustrating an overview of transformation characteristics of video signals.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, the description will be made in the following order.

1. Description of related technology
1-1. Transformation characteristics of video signals
1-2. Example of signal scheme for HDR video signal
1-3. Optimization to display peak
2. Configuration example of image processing apparatus
2-1. Image acquisition unit
2-2. Transformation unit
2-3. Control unit
3. Flow of process
3-1. Image transformation process
3-2. RW maintenance gamma transformation process
3-3. Linear transformation process
4. Recording and reproducing HLG video
4-1. Recognition of HLG video
4-2. Flow of process
4-3. Handling complementary stream
5. Example of hardware configuration
6. Application examples
7. Conclusion

1. DESCRIPTION OF RELATED TECHNOLOGY

First, a technology related to the present disclosure will be described with reference to FIGS. 1 to 4.

1-1. Transformation Characteristics of Video Signals

FIG. 1 is an explanatory diagram illustrating an overview of transformation characteristics of video signals. In FIG. 1, an imaging apparatus 10, a network 20, a recording apparatus 30, and a display apparatus 50 are illustrated. The imaging apparatus 10 images a subject in an imaging environment and generates video signals. More specifically, the imaging apparatus 10 has an array of photoelectric transformation elements (image sensors) such as charge coupled devices (CCDs) or complementary metal oxide semiconductors (CMOSs) and transforms light incident from an imaging environment into an electric signal. Characteristics of transformation from light into an electric signal are modeled with an opto-electric transfer function (OETF). When the OETF is a linear function, a voltage level of an electric signal is proportional to an amount of received light for each element. Here, the OETF of BT.709 or BT.2020 which are standard specifications formulated by ITU-R is nonlinear and has linearity in only a low-luminance region, for example, with an overall gamma value of 0.45.

The imaging apparatus 10 transmits video signals including image signals and control signals of a series of frames to the display apparatus 50 via a network 20 or causes the recording apparatus 300 to record the video signals on a recording medium. The network 20 may be a wired communication network or a wireless communication network or may be a simple connection table. The recording apparatus 30 records the video signals received from the imaging apparatus 10 on a recording medium in conformity with a designated recording scheme. The recording medium may be a removable medium such as a Blu-ray (registered trademark) disc (BD) or a digital versatile disc (DVD) or an internal medium such as a hard disk.

The display apparatus 50 reproduces a video from the video signals received via the network 20 or read from the recording medium. More specifically, the display apparatus 50 has an array of display elements that transform an input electric signal into light (for example, a liquid crystal panel, an organic light emitting diode (OLED) panel, a plasma display panel (PDP) or the like). Characteristics of the transformation from an electric signal into a light can be modeled with an electro-optical transfer function (EOTF). When the EOTF is an inverse function of the OETF, the intensity of light to be displayed is the same as the intensity of imaged light. Characteristics of transformation from imaged light of end-to-end including the OETF and EOTF into display light are referred to as an opto-optical transfer function (OOTF). The OOTF is also called system gamma or total gamma. A gamma value of the EOTF of BT.1886 which is a standard specification formulated by ITU-R is 2.4. For example, the gamma value of the OETF is 0.5, a system gamma value (0.5×2.4=)1.2.

1-2. Example of Signal Scheme for HDR Video Signal

The upper limit of a general luminance dynamic range of SDR video signals of the related art is 100 cd/m² (also referred to as nits). On the other hand, the upper limit of a luminance dynamic range of HDR video signals is extended from hundreds of cd/m² to thousands of cd/m². As described above, ITU-R is expected to write two schemes, Application-1 and Application-2, as signal schemes for HDR video signals in recommendations.

Figure 2:
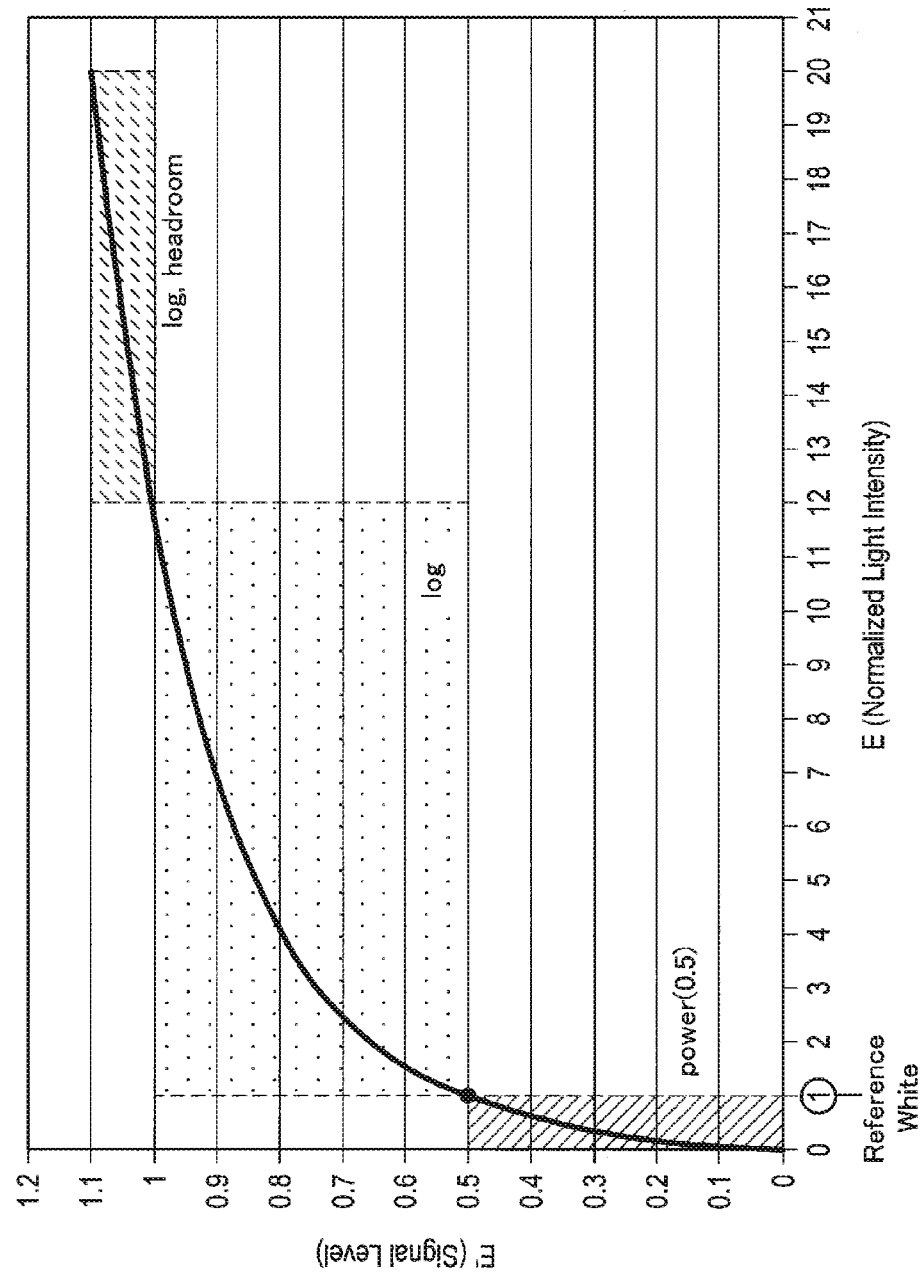
FIG. 2 is an explanatory diagram illustrating an OETF of ITU-R Application-2.

FIG. 2 is an explanatory diagram illustrating the opto-electric transfer function of ITU-R Application-2. Application-2 expresses a relative luminance level with a hybrid log-gamma (HLG) in which a gamma curve at a luminance level lower than the reference white and a logarithmic curve at a luminance level higher than the reference white are combined. In FIG. 2, the horizontal axis represents intensity E of light normalized so that a luminance level of the reference white is equal to 1 and the vertical axis represents a signal level E' of a corresponding electric signal. The OETF of Application-2 is designed to meet the following conditions C1 to C3 and is expressed as in Expression (1):

C1) E'=0.5 with the reference white (E=1);
C2) E'=1 at light intensity (E=12) of 12 times the reference white; and
C3) the gamma curve and the logarithmic curve are smoothly connected at a slope of 0.25 in the reference white (E=1).

[Math. 1]

$$E' = \begin{cases} r \times \sqrt{E} & (0 \leq E \leq 1) \\ a \times \ln(E-b) + c & (1 < E) \end{cases} \quad (1)$$

where $r = 0.5$,
$a = 0.17883277$,
$b = 0.28466892$,
$c = 0.55991073$

As can be understood from Expression (1), the gamma value is equal to 0.5 in a low-luminance region less than the reference white and there is no linear portion. Thus, a Weber fraction is improved in a dark situation. In a case in which headroom is not used, the upper limit of a luminance dynamic range of Application-2 is 12 times the reference white (E=12), which is equivalent to 1200 cd/m² when the reference white is 100 cd/m². In a case in which headroom is used, the upper limit of the luminance dynamic range reaches 2000 cd/m² corresponding to E=20. Here, in a case in which system gamma greater than 1 is used, the upper limit of the luminance dynamic range further increases.

Figure 3:
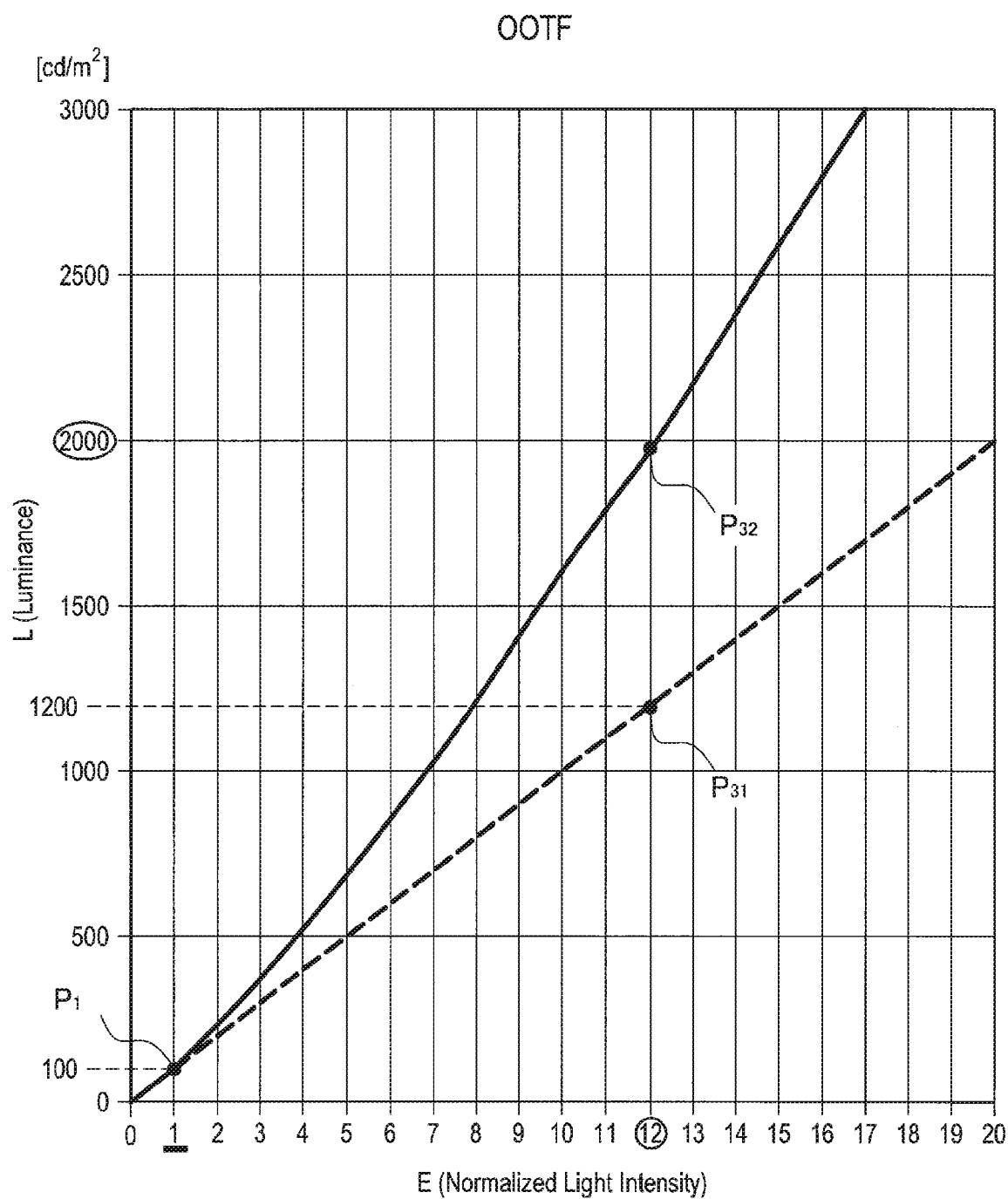
FIG. 3 is an explanatory diagram illustrating an OOTF of ITU-R Application-2.

FIG. 3 is an explanatory diagram illustrating the OOTF of ITU-R Application-2. In FIG. 3, the horizontal axis represents intensity E of normalized light as in FIG. 2 and the vertical axis represents a luminance level L (cd/m²) after inverse transformation (OETF$^{-1}$) is executed. A dotted line indicates the OOTF in a case in which system gamma $\gamma_S$=1.0. When E=1, L=100 (point $P_1$). When E=12, L=1200 (point $P_{31}$). A solid line indicates the OOTF in a case in which system gamma $\gamma_S$=1.2. When E=1, L=100 (point $P_1$). When E=12, L=1200$^{1.2}$≈2000 (point $P_{32}$). The system gamma $\gamma_S$=1.2 is generally used for SDR display of the related art and is known as a value for realizing a visually natural video.

In FIG. 3, an example of ITU-R Application-2 is illustrated. In another HDR signal scheme such as ITU-R Application-1, the upper limit of the luminance dynamic range also reaches hundreds of cd/m² to thousands of cd/m².

1-3. Optimization to Display Peak

Even when the upper limit of the luminance dynamic range is extended by the HDR signal scheme, peak luminance of a display is not necessarily matched with the upper limit. In a case in which luminance of one or more pixels included in a video signal exceeds peak luminance of a display, so-called halation occurs inside a reproduced video as a clipping result. In a case in which maximum luminance is less than peak luminance of a display, the maximum performance of the display is not utilized. In order to resolve the mismatch between the ranges, several methods can be considered.

Figure 4:
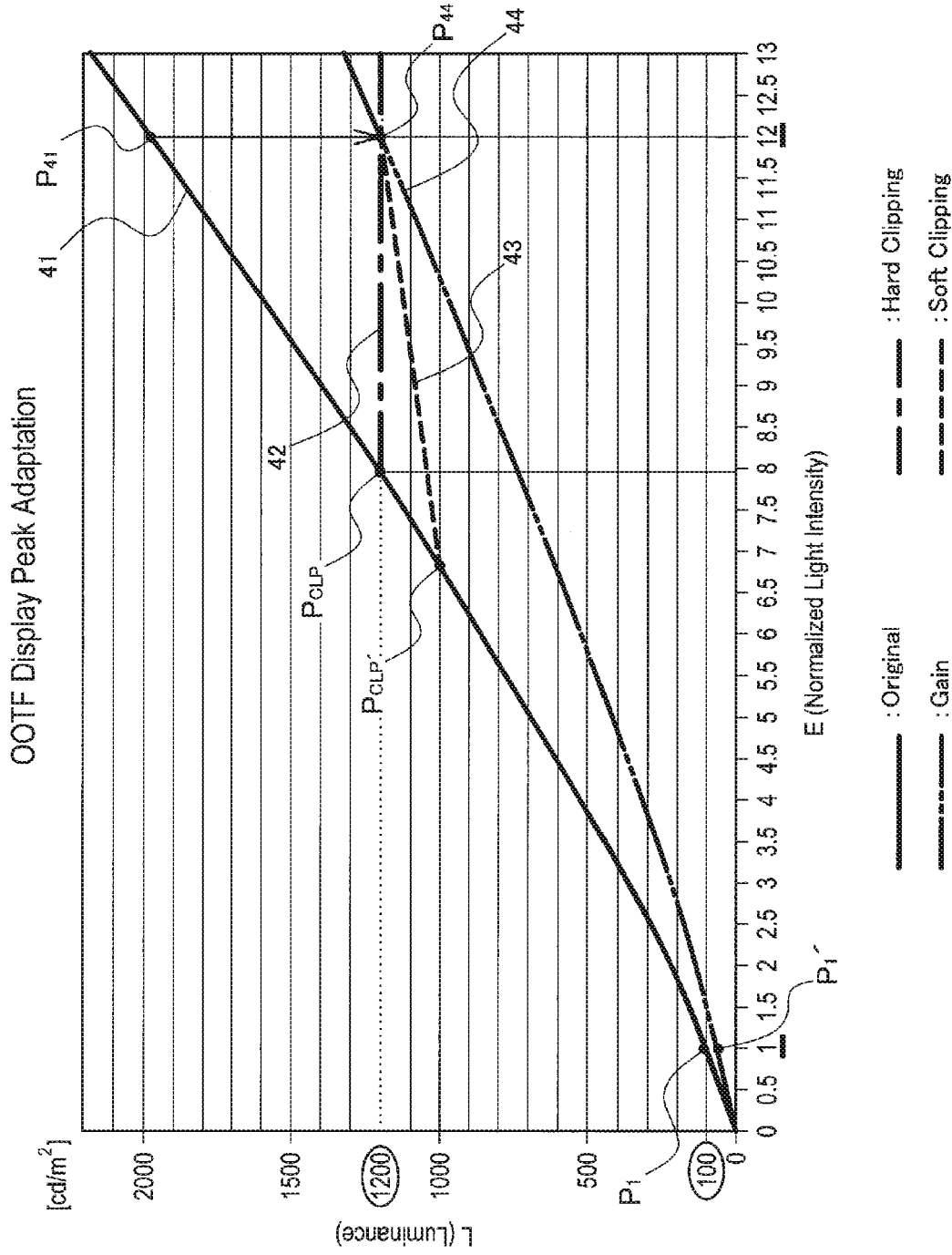
FIG. 4 is an explanatory diagram illustrating examples of several methods of optimizing a luminance dynamic range to peak luminance of a display.

FIG. 4 is an explanatory diagram illustrating examples of several methods of optimizing the luminance dynamic range to peak luminance of a display. As in FIG. 3, the horizontal axis represents intensity E of normalized light and the vertical axis represents a luminance level L. A graph 41 indicated by a solid line is the OOTF before optimization to the peak luminance in a case in which the system gamma $\gamma_S$=1.2.

A graph 42 indicated by a one-dot chain line is a result obtained by executing hard clipping on the original OOTF (the graph 41) at the peak luminance of the display. Such clipping causes halation in a region in which the light intensity E is greater than a clipping point $P_{CLP}$, which damages image information. A graph 43 indicated by a dashed line is a result of soft clipping for causing the OOTF to have a slope in a region in which the light intensity E is greater than a clipping point $P_{CLP}'$. In the soft clipping, complete halation does not occur, but a slope at the clipping point $P_{CLP}'$ is discontinuous. Therefore, display of an unnatural video is caused in some cases.

A graph 44 indicated by a two-dot chain line is a result obtained by executing linear transformation on the original OOTF at a constant gain. For example, in a case in which the peak luminance of the display is 1200 cd/m², the luminance level corresponding to E=12 can be lowered from about 2000 to about 1200 ($P_{41} \rightarrow P_{44}$) by applying linear transformation at a gain G=1200/2000. In this case, however, even a luminance level corresponding to the reference white (E=1) which is to be fixedly handled is changed ($P_1 \rightarrow P_1'$). When the luminance level of the reference white is changed, it is difficult to appropriately represent lightness of an imaging environment (or lightness which a content maker desires a viewer to view). Such linear transformation is inconsistent with, for example, an objective of ITU-R Application-2.

An embodiment of the technology related to the present disclosure to be described in the following sections provides a structure resolving or at least reducing the above-described trouble related to the mismatch between a dynamic range of an HDR video signal and peak luminance of a display.

2. CONFIGURATION EXAMPLE OF IMAGE PROCESSING APPARATUS

Figure 5:
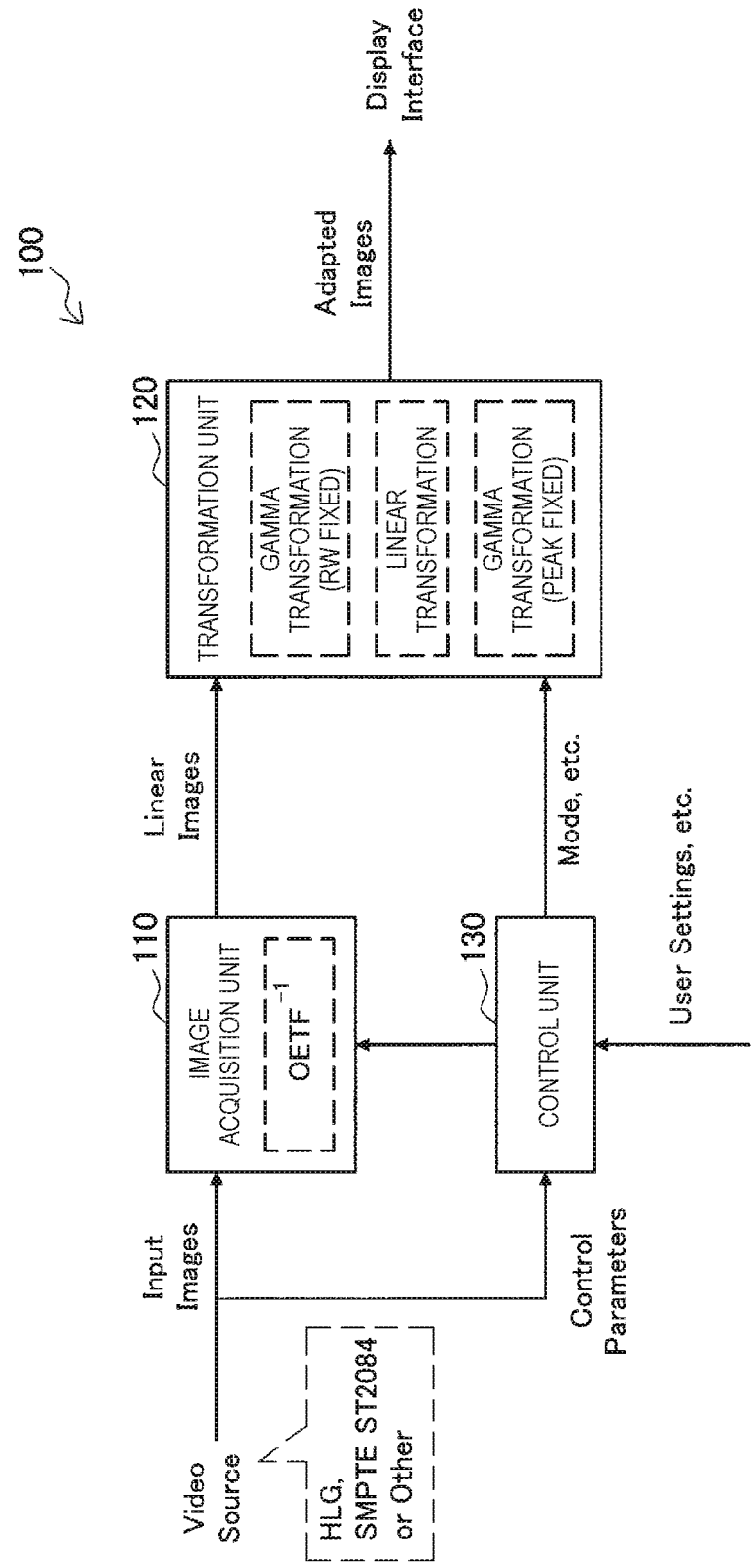
FIG. 5 is a block diagram illustrating an example of a configuration of an image processing apparatus according to an embodiment.

FIG. 5 is a block diagram illustrating an example of a configuration of an image processing apparatus 100 according to an embodiment. The image processing apparatus 100 may be, for example, the imaging apparatus, the recording apparatus, or the display apparatus illustrated in FIG. 1 or may be an image processing module mounted on this apparatus. Referring to FIG. 5, the image processing apparatus 100 includes an image acquisition unit 110, a transformation unit 120, and a control unit 130.

2-1. Image Acquisition Unit

The image acquisition unit 110 acquires input image signals from any signal source. The input image signals may be image signals of each of a series of frames configuring video signals or may be image signals for a still image. The input image signals are based on an HDR signal scheme. Here, for example, image signals based on ITU-R Application-2 (hereinafter referred to as HLG image signals) are assumed to be acquired. ITU-R Application-2 is an example of a signal scheme of fixedly handling a display luminance level of the reference white. The HLG image signals are signals normalized at a luminance level of the reference white.

The image acquisition unit 110 generates linear image signals by applying an inverse function (OETF$^{-1}$) of an OETF of a scheme for the acquired input image signals to the input image signals. The linear image signals are signals for linearly expressing intensity of light at the time of imaging. Here, calculation of the inverse function may be implemented as numerical calculation in which a calculation parameter stored in advance for each signal scheme is used or may be implemented using a lookup table in which input values and output values of signals are mapped. Then, the image acquisition unit 110 outputs the generated linear image signals to the transformation unit 120.

2-2. Transformation Unit

The transformation unit 120 transforms the linear image signals input from the image acquisition unit 110 into display signals by executing the gamma transformation so that a display luminance level of the reference white is maintained using a parameter decided on the basis of a peak luminance level of a display.

(1) Three Types of Basic Transformation

In the embodiment, the transformation unit 120 transforms a signal level of an image signal using a transformation method equivalent to one of the following three types of basic transformation or a combination of two or more of the following three types of basic transformation:

reference white (RW) fixed gamma transformation;
linear transformation; and
peak fixed gamma transformation.

The RW fixed gamma transformation is gamma transformation in which a luminance level of the reference white is not changed. In the case of an HLG image, the image signals are normalized at the luminance level of the reference white, that is, E=1 in the reference white. Accordingly, the RW fixed gamma transformation can be expressed as a function $T_1(E)$ of the image signals E as in the following expression.

[Math. 2]

$$T_1(E)=E^\gamma \quad (2)$$

Figure 6A:
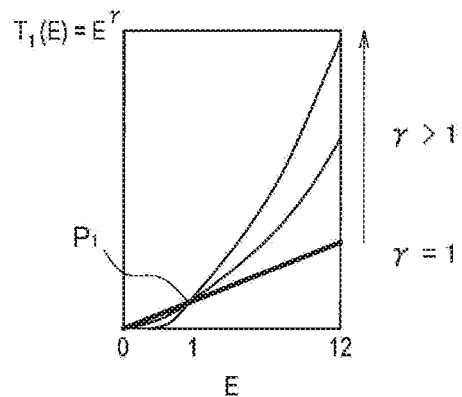
FIG. 6A is a graph illustrating reference white (RW) fixed gamma transformation.

FIG. 6A is a graph illustrating the RW fixed gamma transformation. In the RW fixed gamma transformation, in a case in which a gamma value is greater than 1, the luminance level decreases in a range lower than the reference white and the luminance level increases in a range higher than the reference white. In a case in which the gamma value is less than 1, the luminance level increases in a range lower than the reference white and the luminance level decreases in a range higher than the reference white. The luminance level of the reference white is maintained.

The linear transformation is expressed as a function $T_2(E)$ of the image signal E using a gain value G as in the following expression.

[Math. 3]

$$T_2(E)=G \times E \quad (3)$$

Figure 6B:
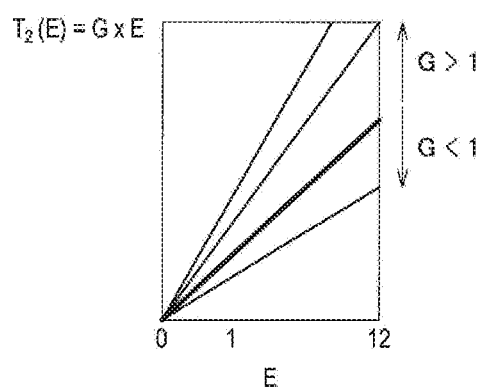
FIG. 6B is a graph illustrating linear transformation.

FIG. 6B is a graph illustrating the linear transformation. In the linear transformation, in a case in which the gain value G is greater than 1, the luminance level increases over the whole range. In a case in which the gain value is less than 1, the luminance level decreases over the whole range. When the gain value is not 1, the luminance level of the reference white is also changed.

The peak fixed gamma transformation is gamma transformation in which an upper limit of the dynamic range is not changed. The peak fixed gamma transformation can be expressed as a function $T_3(E)$ of the image signal E using a parameter K equivalent to the upper limit of an input value as in the following expression.

[Math. 4]

$$T_3(E)=(E/K)^\gamma \quad (4)$$

Figure 6C:
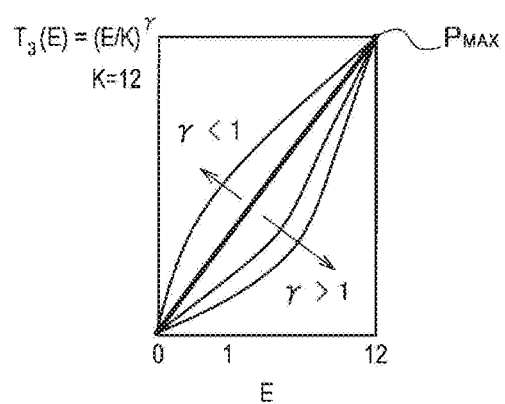
FIG. 6C is a graph illustrating peak fixed gamma transformation.

FIG. 6C is a graph illustrating the peak fixed gamma transformation. Here, K=12. In the peak fixed gamma transformation, In a case in which the gamma value is greater than 1, the luminance level decreases over the whole range. In a case in which the gamma value is less than 1, the luminance level increases over the whole range. A rate of a change in the luminance level is greater as being closer to the middle of the range. When the gain value is not 1, the luminance level of the reference white is also changed.

The role of the transformation unit 120 is to align the maximum luminance level expressible by the display signals with the peak luminance level of the display and to maintain the display luminance level of the reference white as necessary. Here, the peak luminance level of the display may be a maximum luminance level from the viewpoint of performance of the display (or a display element) or may be a largest luminance level from the viewpoint of an addition restriction (for example, a user setting, an environment condition, or the like) which is less than the upper limit from the viewpoint of the performance. In a first transformation method to be described below in detail, the display luminance level of the reference white is maintained through the RW fixed gamma transformation. In a second transformation method, the display luminance level of the reference white is maintained in a combination of the linear transformation and the peak fixed gamma transformation.

(2) First Transformation Method

In the first transformation method, the transformation unit 120 decides a first gamma value $\gamma_1$ so that the maximum luminance level expressible by the display signals is aligned with the peak luminance level of the display and executes gamma transformation on the linear image signals using the decided first gamma value $\gamma_1$.

Figure 7A:
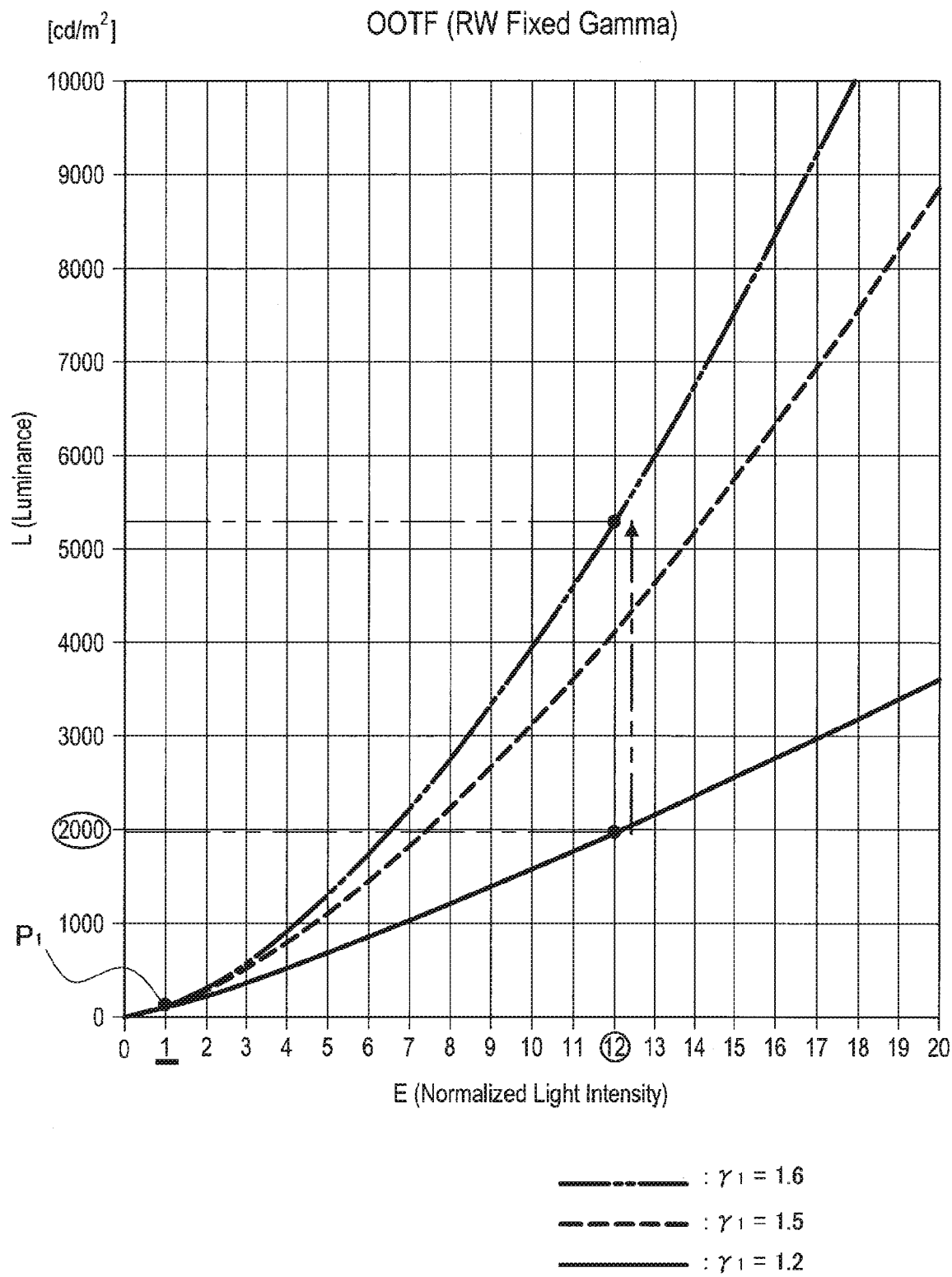
FIG. 7A is a first explanatory diagram illustrating a change in the OOTF in compliance with RW fixed gamma transformation.

FIG. 7A is a first explanatory diagram illustrating a change in the OOTF in compliance with RW fixed gamma transformation. In the example of FIG. 7A, the peak luminance of the display is assumed to be greater than 2000 cd/m². A graph indicated by a solid line represents a case of $\gamma_1=1.2$, a graph indicated by a dashed line represents a case of $\gamma_1=1.5$, and a graph indicated by a two-dot chain line represents a case of $\gamma_1=1.6$. An upper limit of the luminance dynamic range in a case in which $\gamma_1=1.2$ and headroom is not used is about 2000 cd/m². When the gamma value $\gamma_1$ is raised up to 1.5, the expressible maximum luminance level becomes about 4000 cd/m². When the gamma value $\gamma_1$ is raised up to 1.5, the expressible maximum luminance level exceeds 5000 cd/m². An upper limit of the luminance dynamic range in a case in which $\gamma_1=1.2$ and headroom is used is about 3600 cd/m². When the gamma value $\gamma_1$ is raised up to 1.5, the expressible maximum luminance level reaches about 9000 cd/m². The luminance level of the reference white is maintained (point $P_1$).

Figure 7B:
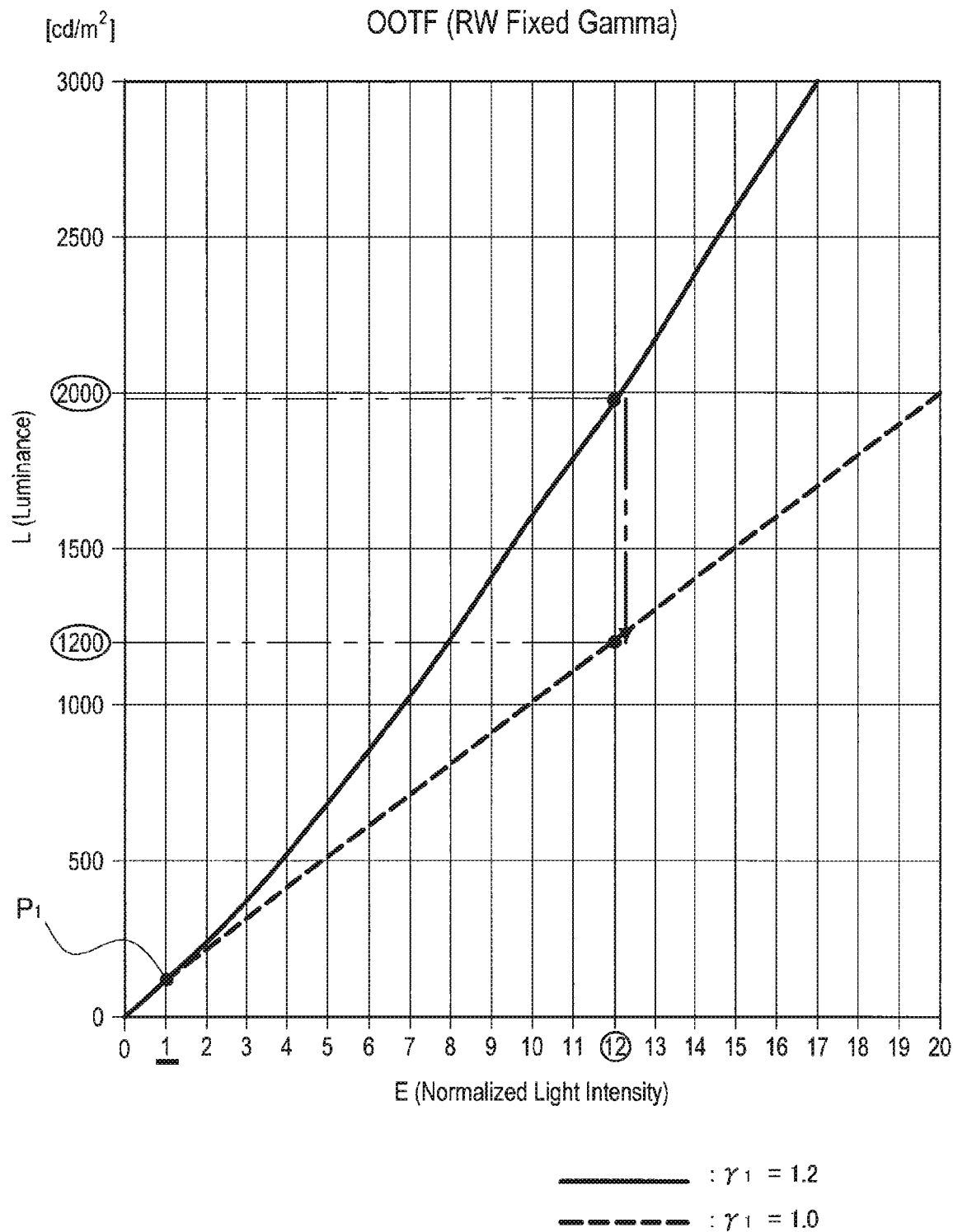
FIG. 7B is a second explanatory diagram illustrating a change in the OOTF in compliance with RW fixed gamma transformation.

FIG. 7B is a second explanatory diagram illustrating a change in the OOTF in compliance with RW fixed gamma transformation. In the example of FIG. 7B, the peak luminance of the display is assumed to be less than 2000 cd/m². A graph indicated by a solid line represents a case of $\gamma_1=1.2$ and a graph indicated by a dotted line represents a case of $\gamma_1=1.0$. An upper limit of the luminance dynamic range in a case in which $\gamma_1=1.2$ and headroom is not used is about 2000 cd/m². An upper limit of the luminance dynamic range in a case in which $\gamma_1=1.0$ and headroom is not used is about 1200 cd/m². The luminance level of the reference white is maintained (point $P_1$). When the gamma value $\gamma_1$ satisfies $1.0 \leq \gamma_1 < 1.2$, system gamma of a low-luminance region ($0 < E < 1$) is less than in a case of SDR display of the related art, but the visual influence is not great so much.

Figure 7C:
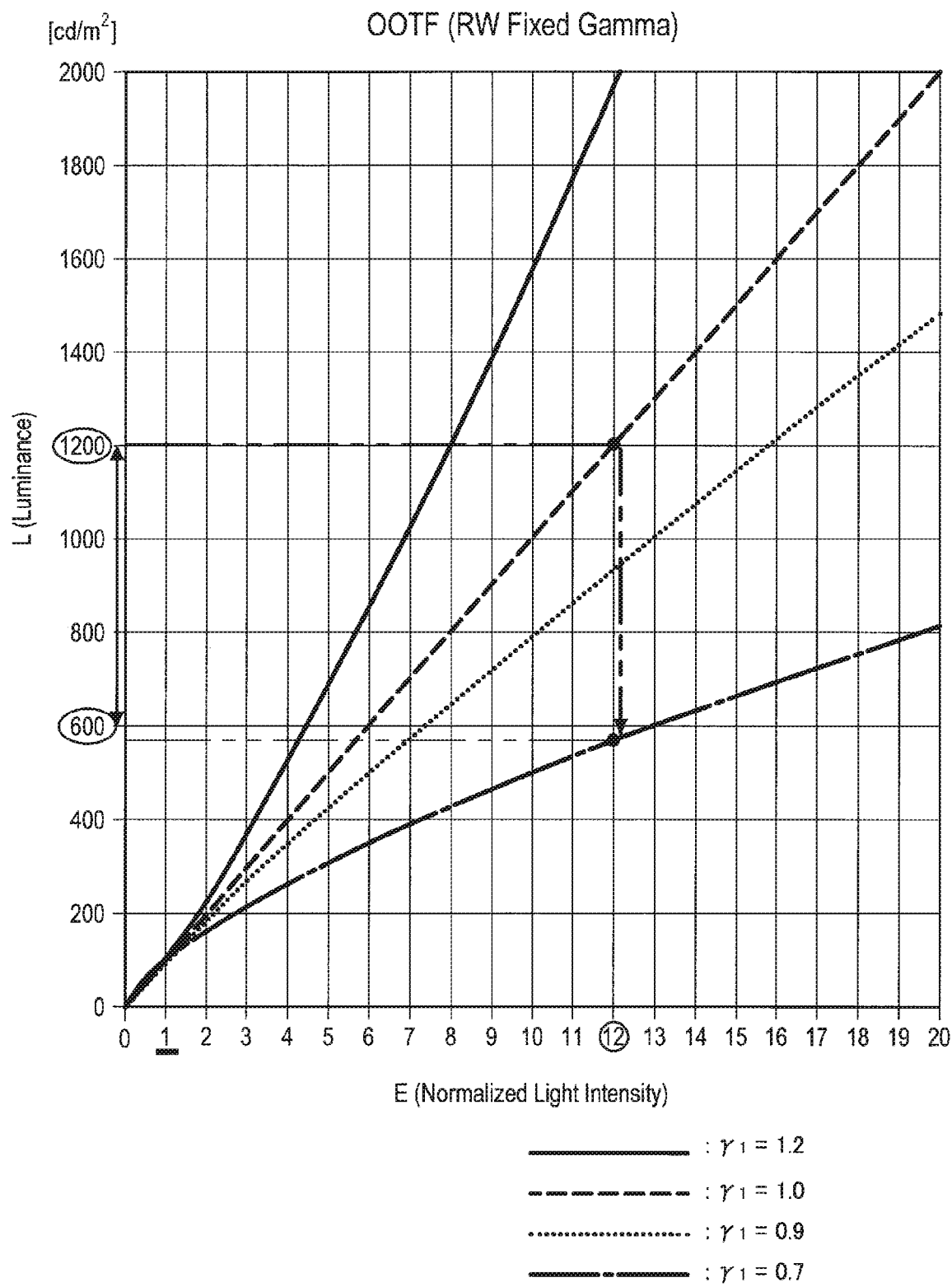
FIG. 7C is a third explanatory diagram illustrating a change in the OOTF in compliance with RW fixed gamma transformation.

FIG. 7C is a third explanatory diagram illustrating a change in the OOTF in compliance with RW fixed gamma transformation. In the example of FIG. 7C, the peak luminance of the display is assumed to be less than 1200 cd/m². A graph indicated by a solid line represents a case of $\gamma_1=1.2$, a graph indicated by a dashed line represents a case of $\gamma_1=1.0$, a graph indicated by a dotted line represents a case of $\gamma_1=0.9$, and a graph indicated by a one-dot chain line represents a case of $\gamma_1=0.7$. An expressible maximum luminance level in a case in which $\gamma_1=0.9$ and headroom is not used is less than about 1000 cd/m². An expressible maximum luminance level in a case in which $\gamma_1=0.7$ and headroom is not used is less than about 600 cd/m². In the cases, the luminance level of the reference white is maintained. However, in the low-luminance region ($0 < E < 1$), gray is seen to emerge in a subject which is originally to be dark and subjective image quality deteriorates.

(3) Second Transformation Method

In the second transformation method, the transformation unit 120 decides the gain value G so that the maximum luminance level expressible by the display signals is aligned with the peak luminance level of the display and executes linear transformation on the linear image signals using the decided gain value G. Further, the transformation unit 120 decides a second gamma value $\gamma_2$ so that the display luminance level of the reference white is restored to the original luminance level and executes the gamma transformation on the image signals subjected to the linear transformation using the decided second gamma value $\gamma_2$. The transformation unit 120 executes the gamma transformation using the second gamma value $\gamma_2$ so that the peak luminance level is not changed. The transformation unit 120 may handle, as signals to be input to the second transformation method, intermediate image signals obtained by executing the gamma transformation on the linear image signals using a predetermined system gamma value $\gamma_S$ (for example, $\gamma_S=1.2$), instead of the linear image signal.

Figure 8A:
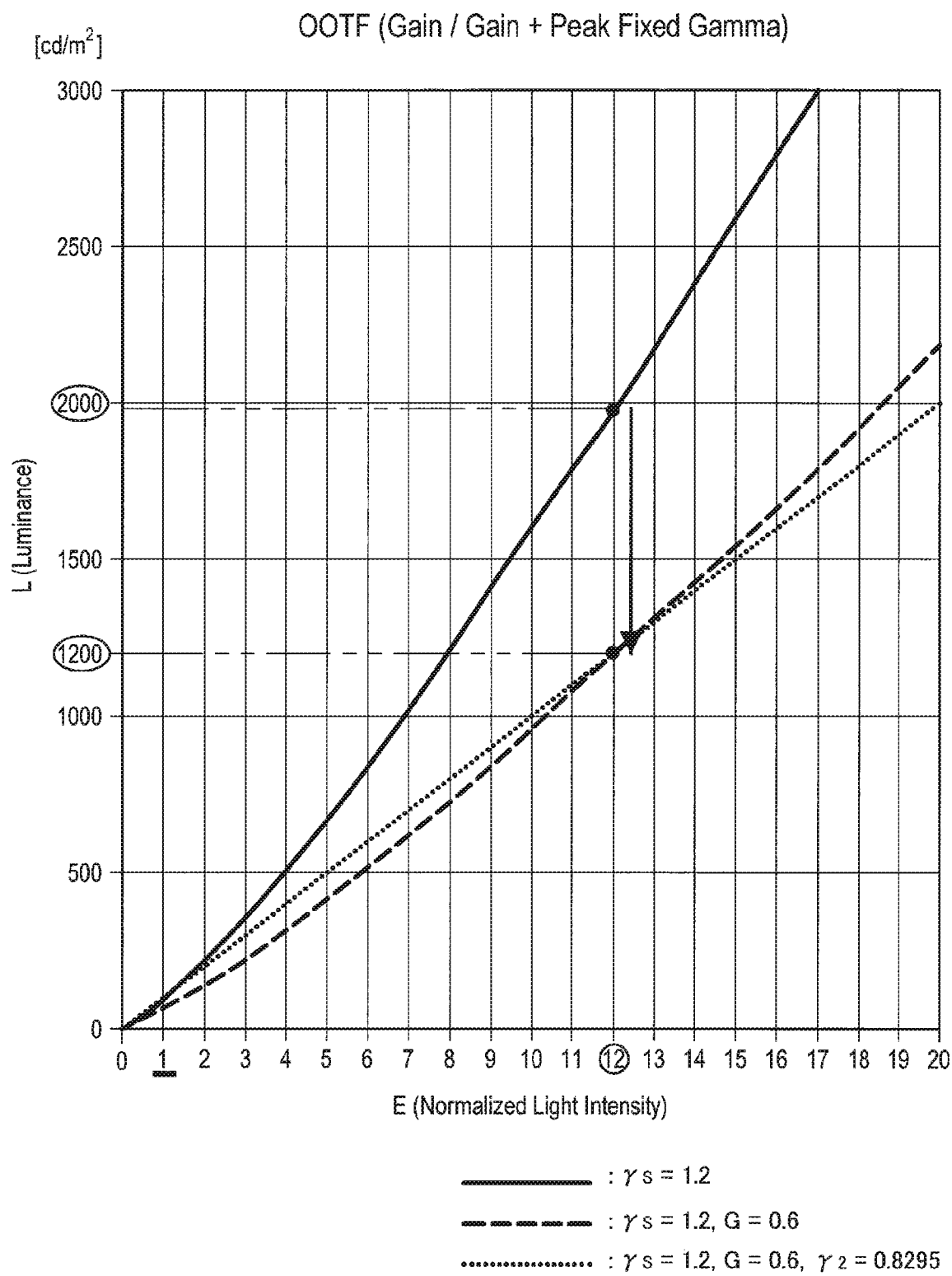
FIG. 8A is an explanatory diagram illustrating a change in the OOTF in compliance with linear transformation and peak fixed gamma transformation.
Figure 8B:
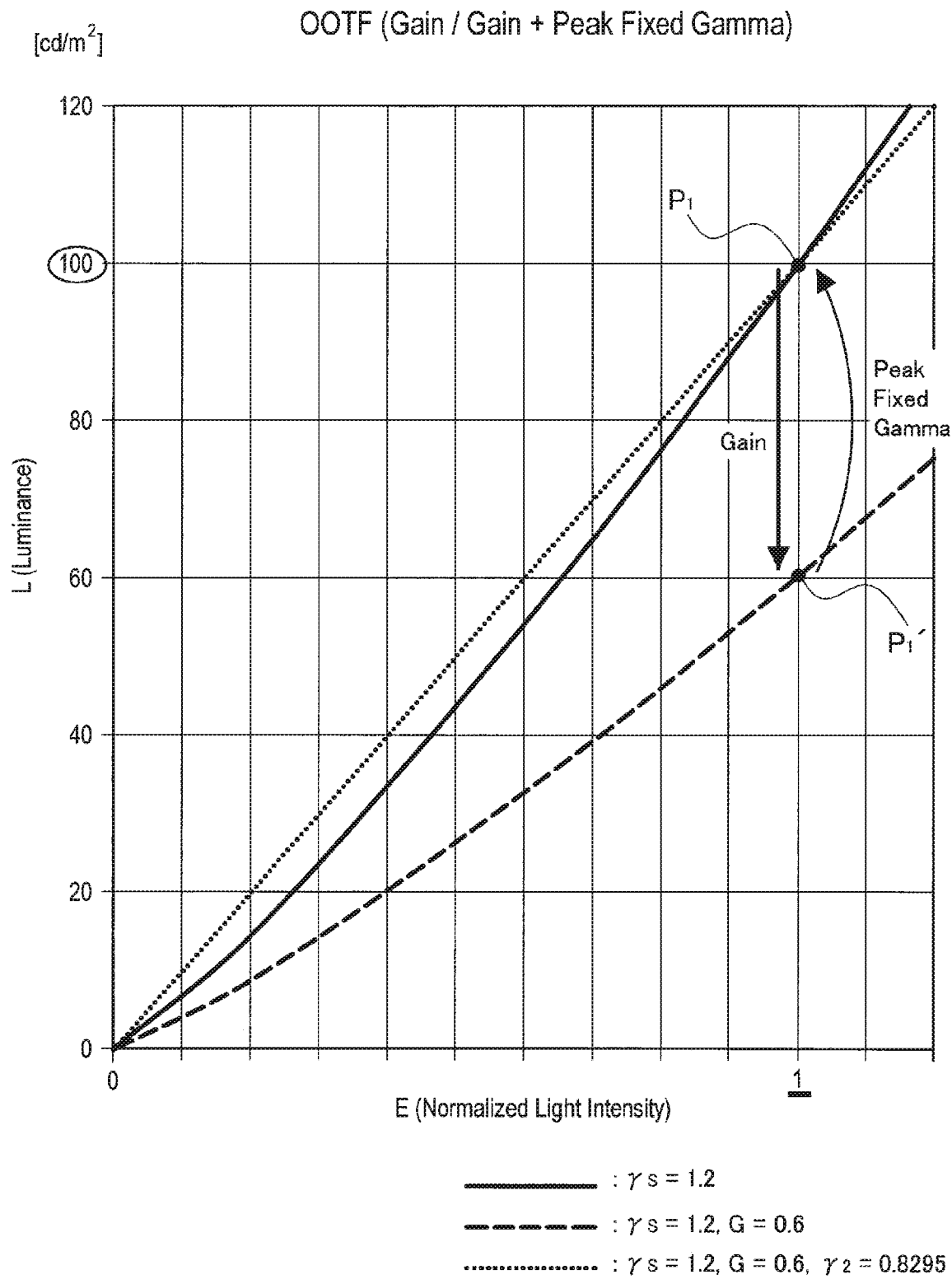
FIG. 8B is an enlarged diagram illustrating a low-luminance region of FIG. 8A.

FIG. 8A is an explanatory diagram illustrating a change in the OOTF in compliance with the linear transformation and the peak fixed gamma transformation. FIG. 8B is an enlarged diagram illustrating a low-luminance region of FIG. 8A. In the drawings, a graph indicated by a solid line represents a case of $\gamma_S=1.2$ before application of the second transformation method. A graph indicted by a dashed line represents a case of $\gamma_S=1.2$ after application of only the linear transformation at the gain G=0.6. A graph indicted by a dotted line represents a case of $\gamma_S=1.2$ after application of only the linear transformation at the gain G=0.6 and application of a second gamma value $\gamma_S=0.8295$. As understood from FIG. 8A, an upper limit of the luminance dynamic range in a case in which $\gamma_1=1.2$ and headroom is not used is about 2000 cd/m². For example, when the linear transformation is executed at the gain G=0.6 in a case in which the peak luminance of the display is 1200 cd/m², the upper limit of the luminance dynamic range, that is, the expressible maximum luminance level, is lowered up to about 1200 cd/m² close to the peak luminance of the display. As a result, occurrence of halation is suppressed and the maximum performance of the display can be utilized. As understood from 8B, however, even the luminance level of the reference white which is to be fixedly handled is also lowered (point $P_1 \rightarrow$ point $P_1'$). Accordingly, the gamma transformation is further executed at the second gamma value $\gamma_2=0.8295$. Here, in order not to change the peak luminance level, the input value E of the gamma transformation herein is divided by the parameter K as in the foregoing Expression (4). For example, a value of the parameter K may be 12 in a case in which headroom is not used. The value of the parameter K may be 20 in a case in which headroom is used. As a result of the gamma transformation at the second gamma value $\gamma_2$, the display luminance level of the reference white is restored to the original luminance level (point $P_1' \rightarrow$ point $P_1$).

(4) Another Method

The transformation unit 120 may support both a first operation mode in which the display luminance level of the reference white is maintained and a second operation mode in which the display luminance level of the reference white is not maintained. Here, for example, the first and second operation modes are referred to as an RW maintenance mode and an RW non-maintenance mode, respectively. In a case in which the RW maintenance mode is selected, the transformation unit 120 executes either the first transformation method or the second transformation method described above. Conversely, in a case in which the RW non-maintenance mode is selected, the transformation unit 120 outputs display signals in accordance with another method without maintaining the display luminance level of the reference white.

For example, in the case in which the RW non-maintenance mode is selected, the transformation unit 120 may transform the image signals into the display signals in conformity with ITU-R BT.1886. As a display output (SDR display) in ITU-R BT.1886, a gamma value of 2.4 is used over the whole range. Instead of or in addition to the gamma value, the transformation unit 120 may also decide a gain value so that the maximum luminance level expressible by the display signals is aligned with the peak luminance level of the display and may execute the linear transformation on the image signals using the decided gain value.

Figure 9:
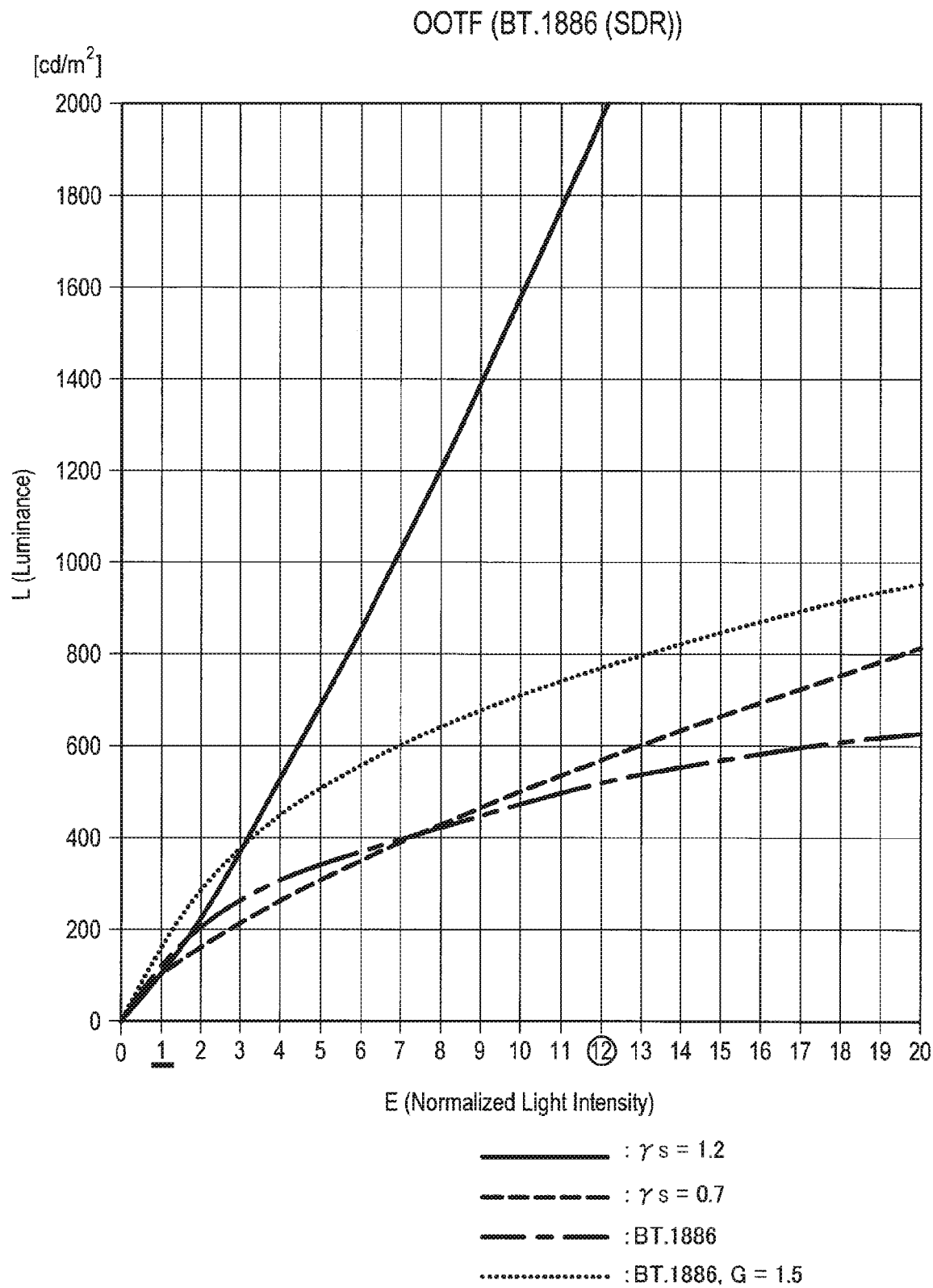
FIG. 9 is an explanatory diagram illustrating the OOTF in SDR display of BT.1886.

FIG. 9 is an explanatory diagram illustrating the OOTF in SDR display of BT.1886. In FIG. 9, graphs indicated by a solid line and a dashed line represent cases of $\gamma_S=1.2$ and $\gamma_S=0.7$, respectively (rather than the SDR display). A graph indicted by a one-dot chain line represents the OOTF in the SDR display in BT.1886 and a graph indicated by a dotted line represents a result for application of the linear transformation at a gain G=1.5 to the OOTF of the display SDR display. In the SDR display (indicated by the one-dot chain line) at no gain, the expressible maximum luminance level is about 500 $cd/m^2$. Therefore, in a case in which the peak luminance level of the display exceeds about 500 $cd/m^2$, it is necessary to execute the linear transformation at a gain greater than 1. In a case in which an SDR-capable display has such a gain adjustment function, the transformation unit 120 may not execute gain adjustment. In the SDR display, system gamma in the low luminance region (0<E<1) is maintained at about 1.2. Compared to a case (indicated by a dotted line) in which the system gamma $\gamma_S$ is set to a value lower than 1.0, the case (indicated by the one-dot chain line) of the SDR display has an operational effect of raising the luminance level of an intermediate luminance region (1<E<8) on average. Therefore, the SDR display may be an option which is visually better in a case in which the peak luminance of the display is low (for example, less than about 600 $cd/m^2$).

2-3. Control Unit

The control unit 130 controls operations of the image acquisition unit 110 and the transformation unit 120. For example, the control unit 130 determines a signal scheme of the input image signals from control parameters associated with the input image signals and causes the image acquisition unit 110 and the transformation unit 120 to execute a process corresponding to the determined signal scheme. Examples of the control parameters herein will be further described below. The control unit 130 may allow a type of the inverse function of the OETF which the image acquisition unit 110 applies to the input image signals to be switched in accordance with the signal scheme of the input image signals. In addition, the control unit 130 may control the operation mode of the image processing apparatus 100.

In a certain embodiment, the control unit 130 selects the operation mode to be used by the transformation unit 120 between the RW maintenance mode in which the display luminance level of the reference white is maintained and the RW non-maintenance mode in which the display luminance level of the reference white is not maintained. In a case in which the control unit 130 selects the RW maintenance mode, the control unit 130 causes the transformation unit 120 to use the transformation method in which the display luminance level of the reference white is maintained in a transformation process of adjusting the dynamic range. For example, the control unit 130 may select one operation mode on a basis of one or more of the following conditions.

1) A type of signal scheme: the control unit 130 selects the RW maintenance mode in a case in which the signal scheme of the input image signals is a signal scheme of fixedly handling the display luminance level of the reference white (for example, ITU-R Application-2).

2) User setting: a user sets the RW maintenance mode or the RW non-maintenance mode through a user interface. A user who desires to appropriately reproduce lightness of an imaging environment can sets the RW maintenance mode. Instead, the user may set an allowable peak luminance level of the display. In a case in which the allowable peak luminance level is greater than a threshold defined in advance, the control unit 130 can select the RW maintenance mode. Otherwise, the control unit 130 can select the RW non-maintenance mode.

3) An attribute of the display: the control unit 130 determines the peak luminance level of the display from an attribute of the display (for example, a type of device, a model number, or performance values). In a case in which the determined peak luminance level is greater than a threshold defined in advance, the control unit 130 can select the RW maintenance mode. Otherwise, the control unit 130 can select the RW non-maintenance mode.

4) A display environment: the control unit 130 decides a recommendation peak luminance level of the display from a condition of a display environment (environment illuminance, or location, or the like) detected through a sensor (not illustrated). In a case in which the decided recommendation peak luminance level is greater than a threshold defined in advance, the control unit 130 can select the RW maintenance mode. Otherwise, the control unit 130 can select the RW non-maintenance mode.

In another embodiment, the control unit 130 may cause the transformation unit 120 to selectively use the first transformation method (the RW fixed gamma transformation) and the second transformation method (the combination of the linear transformation and the peak fixed gamma transformation) described above. Like the selection of the operation mode described above, the control unit 130 may select one transformation method on a basis of, for example, the mode setting by the user or comparison between a peak luminance value (which can include performance values, an allowable value of a user, and a system recommendation value) and a threshold.

3. FLOW OF PROCESS 3-1. Image Transformation Process

Figure 10:
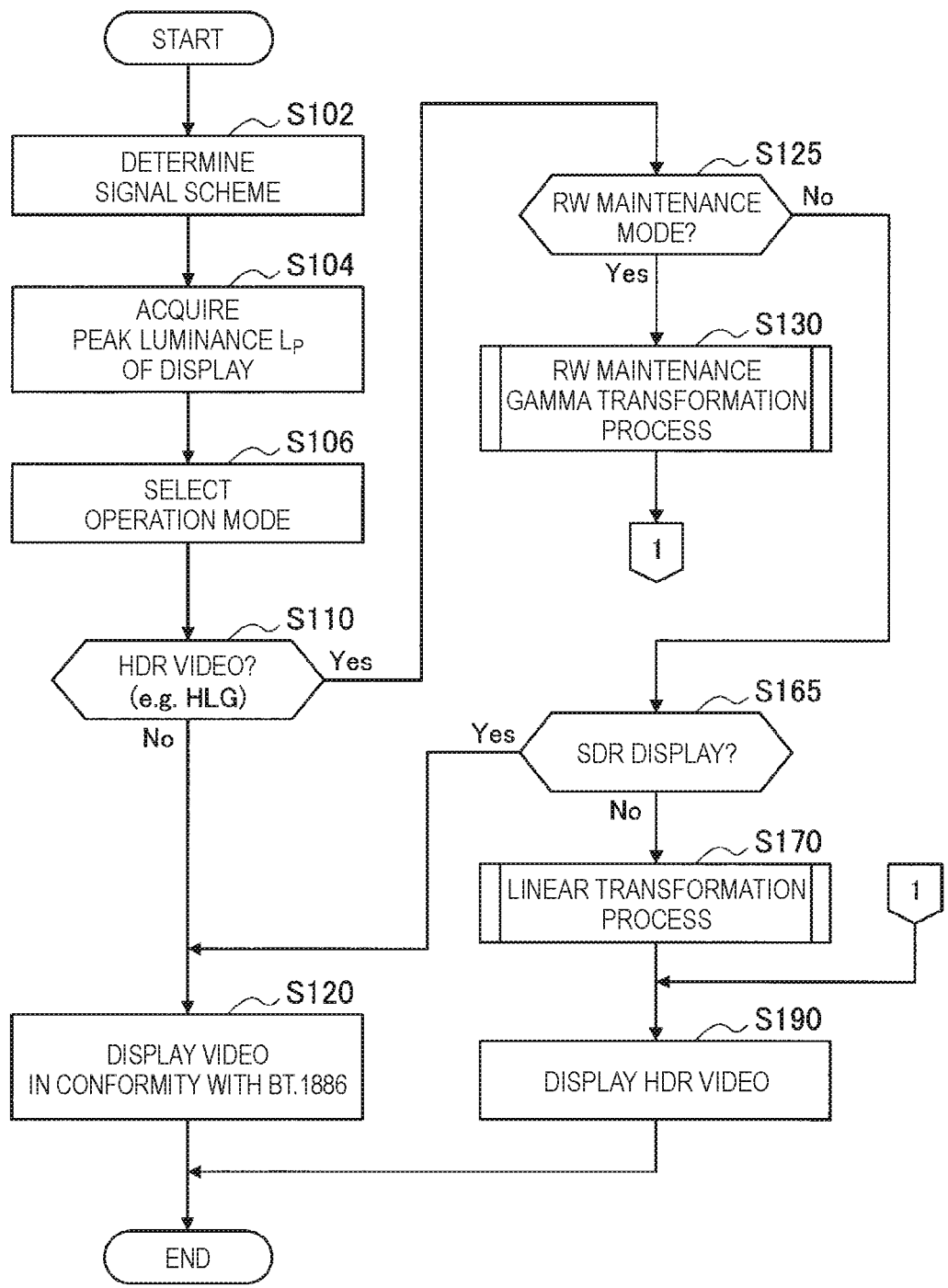
FIG. 10 is a flowchart illustrating an example of a flow of an image transformation process according to an embodiment.

FIG. 10 is a flowchart illustrating an example of a flow of an image transformation process executed by the above-described image processing apparatus 100.

Referring to FIG. 10, the control unit 130 first determines the signal scheme of the input image signals from the control parameters associated with the input image signals (step S102). In addition, the control unit 130 acquires peak luminance $L_P$ of the display (step S104). Subsequently, the control unit 130 selects the operation mode on the basis of the condition, the type of signal scheme or the user setting (step S106).

Subsequently, the image transformation process in FIG. 10 is branched depending on the signal scheme determined in step S102 and the operation mode selected in step S106 (steps S110 and S125). For example, in a case in which the signal scheme is not the HDR scheme, the display signals are output from the transformation unit 120 to the display in conformity with ITU-R BT.1886 and a video is displayed in the SDR (step S120). Conversely, in a case in which the signal scheme is the HDR scheme (for example, the HLG scheme) and the RW maintenance mode is selected, the process proceeds to step S130. In a case in which the signal scheme is the HDR scheme and the RW non-maintenance mode is selected, the process proceeds to step S165.

In step S130, the image acquisition unit 110 and the transformation unit 120 execute an RW maintenance gamma transformation process. In the RW maintenance gamma transformation process, the display luminance level of the reference white (RW) is maintained. A more detailed flow of the RW maintenance gamma transformation process will be further described below.

In a case in which the process transitions to step S165, the display luminance level of the reference white is not necessarily maintained. The control unit 130 determines whether the SDR display is executed on the basis of, for example, the user setting or the peak luminance level of the display determined in step S104 (step S165). In a case in which it is determined that the SDR display is executed, the process proceeds to step S120 and the display signals are output from the transformation unit 120 to the display in conformity with ITU-R BT.1886. In a case in which it is determined that the SDR display is not executed, the process proceeds to step S170 and the linear transformation process is executed by the image acquisition unit 110 and the transformation unit 120 (step S170). A more detailed flow of the linear transformation process will be further described below.

The RW maintenance gamma transformation process or the linear transformation process is executed, the display signals are output to the display and the HDR video is displayed by the display (step S190).

3-2. RW Maintenance Gamma Transformation Process

(1) First Example

Figure 11A:
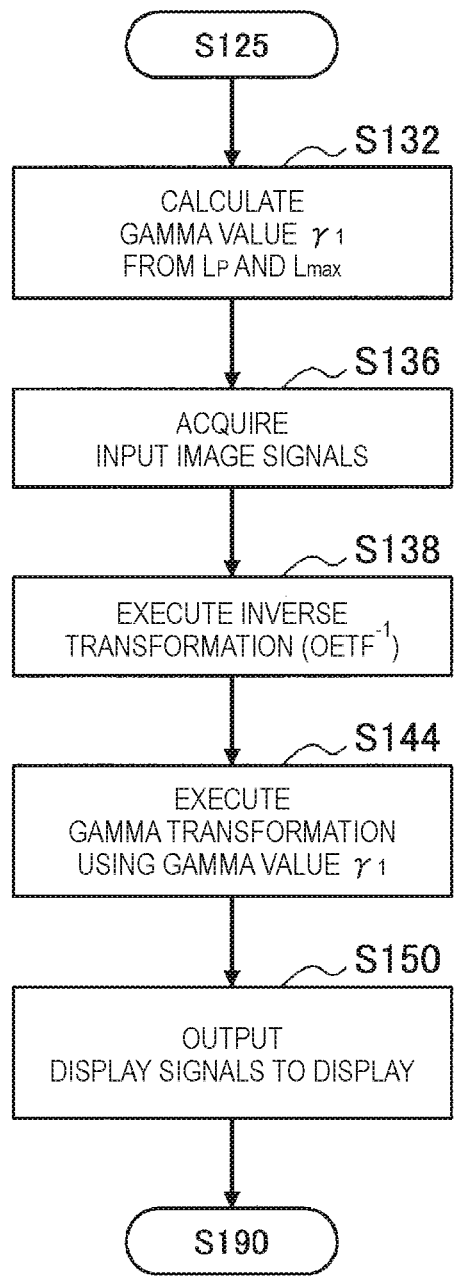
FIG. 11A is a flowchart illustrating a first example of a flow of an RW maintenance gamma transformation process illustrated in FIG. 10.

FIG. 11A is a flowchart illustrating a first example of a flow of the RW maintenance gamma transformation process illustrated in FIG. 10.

Referring to FIG. 11A, the transformation unit 120 first calculates the gamma value $\gamma_1$ from the peak luminance level $L_P$ of the display and an upper limit $L_{max}$ of the luminance dynamic range (step S132). The gamma value $\gamma_1$ can be calculated through, for example, the RW fixed gamma transformation expressed in Expression (2) so that the maximum luminance level expressible by the display signals is aligned with the peak luminance level of the display.

In addition, the image acquisition unit 110 acquires the input image signals from any signal source (step S136) and generates the linear image signals by applying the inverse function (OETF$^{-1}$) of the OETF to the acquired input image signals (step S138).

Subsequently, the transformation unit 120 generates the display signals by executing the gamma transformation on the linear image signals input from the image acquisition unit 110 using the gamma value $\gamma_1$ calculated in step S132 (step S144). Then, the transformation unit 120 outputs the generated display signals to the display (step S150).

(2) Second Example

Figure 11B:
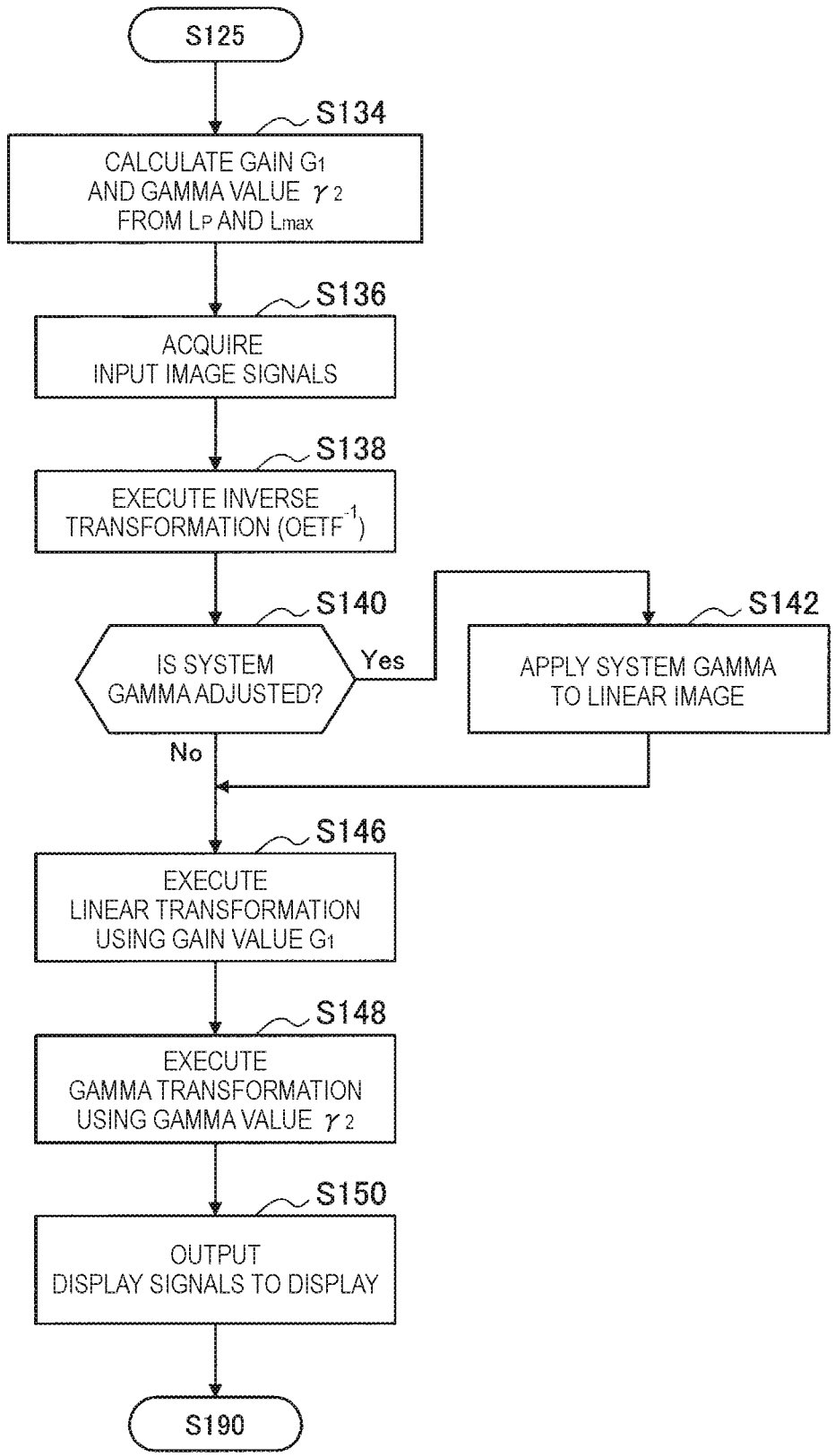
FIG. 11B is a flowchart illustrating a second example of a flow of an RW maintenance gamma transformation process illustrated in FIG. 10.

FIG. 11B is a flowchart illustrating a second example of the flow of the RW maintenance gamma transformation process illustrated in FIG. 10.

Referring to FIG. 11B, the transformation unit 120 first calculates the gain $G_1$ and the gamma value 72 from the peak luminance level $L_P$ of the display and the upper limit $L_{max}$ of the luminance dynamic range (step S134). The gain $G_1$ can be calculated through, for example, the linear transformation expressed in Expression (3) so that the maximum luminance level expressible by the display signals is aligned with the peak luminance level of the display. The gamma value $\gamma_2$ can be calculated so that the display luminance level of the reference white is restored to the original luminance level by further applying the peak fixed gamma transformation expressed in Expression (4).

In addition, the image acquisition unit 110 acquires the input image signals from any signal source (step S136) and generates the linear image signals by applying the inverse function (OETF$^{-1}$) of the OETF to the acquired input image signals (step S138).

Subsequently, the control unit 130 determines whether the system gamma is adjusted on the basis of, for example, the user setting or the peak luminance level of the display (step S140). Here, when it is determined that the system gamma is adjusted, the transformation unit 120 executes the gamma transformation on the linear image signals input from the image acquisition unit 110 using a predetermined system gamma value (for example, 1.2) (step S142).

Subsequently, the transformation unit 120 executes the linear transformation on the linear image signals (the system gamma is adjusted as necessary) using the gain $G_1$ calculated in step S134 (step S146). Subsequently, the transformation unit 120 generates the display signals by executing the gamma transformation on the image signals subjected to the linear transformation using the gamma value $\gamma_2$ calculated in step S134 (step S148). Then, the transformation unit 120 outputs the generated display signals to the display (step S150).

(3) Third Example

Figure 11C:
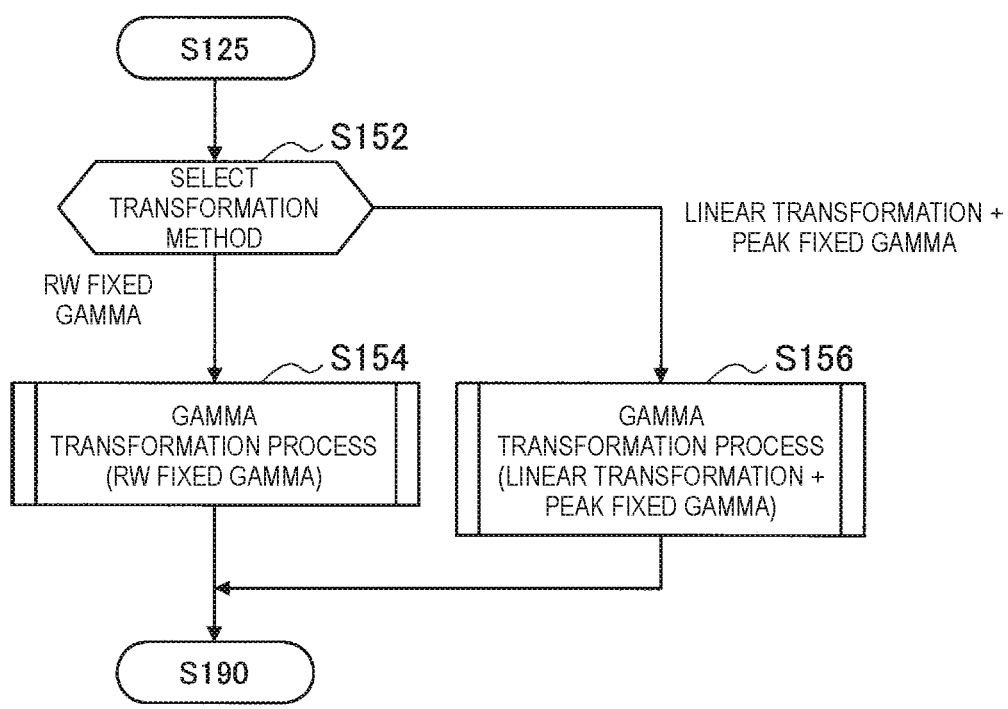
FIG. 11C is a flowchart illustrating a third example of a flow of an RW maintenance gamma transformation process illustrated in FIG. 10.

FIG. 11C is a flowchart illustrating a third example of the flow of the RW maintenance gamma transformation process illustrated in FIG. 10. In the third example, the first and second transformation methods are selectively switched.

Referring to FIG. 11C, the control unit 130 selects one of the first transformation method (the RW fixed gamma transformation) and the second transformation method (the combination of the linear transformation and the peak fixed gamma transformation) in the basis of, for example, the comparison between the mode setting by the user or the peak luminance value (which can include performance values, the allowable value of the user, and the system recommendation value) and a threshold (step S152). Then, in a case in which the control unit 130 selects the first transformation method, the control unit 130 causes the image acquisition unit 110 and the transformation unit 120 to execute steps S132 to S150 illustrated in FIG. 11A (step S154). Conversely, in a case in which the control unit 130 selects the second transformation method, the control unit 130 causes the image acquisition unit 110 and the transformation unit 120 to execute steps S134 to S150 illustrated in FIG. 11B (step S156).

3-3. Linear Transformation Process

Figure 12:
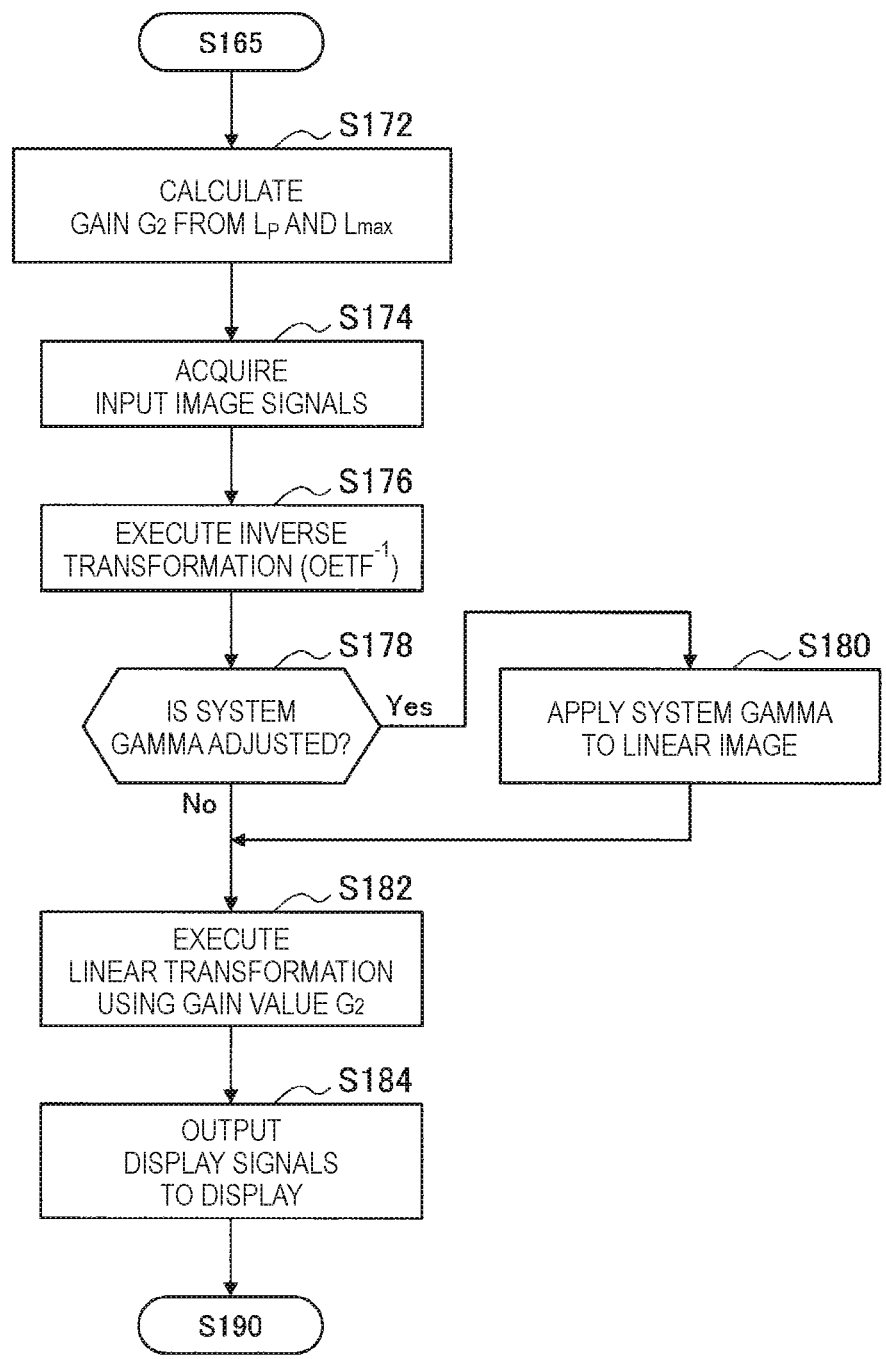
FIG. 12 is a flowchart illustrating an example of a flow of a linear transformation process illustrated in FIG. 10.

FIG. 12 is a flowchart illustrating an example of a flow of the linear transformation process illustrated in FIG. 10.

Referring to FIG. 12, the transformation unit 120 calculates a gain $G_2$ from the peak luminance level $L_P$ of the display and the upper limit $L_{max}$ of the luminance dynamic range (step S172). The gain $G_2$ can be calculated through, for example, the linear transformation expressed in Expression (3) so that the maximum luminance level expressible by the display signals can be aligned with the peak luminance level of the display.

In addition, the image acquisition unit 110 acquires the input image signals from any signal source (step S174) and generates the linear image signals by applying the inverse function ($OETF^{-1}$) of the OETF to the acquired input image signals (step S176).

Subsequently, the control unit 130 determines whether the system gamma is adjusted on the basis of, for example, the user setting or the peak luminance level of the display (step S178). Here, in a case in which it is determined that the system gamma is adjusted, the transformation unit 120 executes the gamma transformation on the linear image signals input from the image acquisition unit 110 using a predetermined system gamma value (for example, 1.2) (step S180).

Subsequently, the transformation unit 120 generates the display signals by executing the linear transformation on the linear image signals (the system gamma is adjusted as necessary) using the gain $G_2$ calculated in step S172 (step S182). Then, the transformation unit 120 outputs the generated display signals to the display (step S184).

4. RECORDING AND PRODUCING HLG VIDEO

4-1. Recognition of HLG Video

As described with reference to FIG. 5, the signal scheme for the input image signals is determined on the basis of the control parameters associated with the input image signals. The image signals of a series of frames are typically compressed and encoded in accordance with any video codec and are subsequently recorded on a recording medium or transmitted over a network. A control parameter for identifying the signal scheme is also encoded and associated with a bit stream of the image signals.

For example, an ultra HD-Blu-ray disc (UHD-BD) which is a next-generation video recording scheme capable of recording an HDR video adopts High Efficiency Video Coding (HEVC) as a video codec. In HEVC, an OETF number for specifying an OETF of encoded image signals can be included in video usability information (VUI). Thus, adding definition of a new value for the HLG scheme has been proposed as a value of the OETF number (Y. Nishida, T. Yamashita, and A. Ichigaya, "Proposed addition of transfer characteristics in VUI," JCTVC-U 0032, JCTVC 21st Meeting, Warsaw, Jun. 19-26, 2015). Here, in the UHD-BD, at present, value restriction is imposed on the OETF number in VUI, and thus a number "18" for a new HLG scheme is not permitted to be used. In addition, signaling a type of signal scheme for HDR video signals in SEI of HEVC has also been proposed (Matteo Naccari, et. al, "High dynamic range compatibility information SEI message," JCTVC-U 0033, JCTVC 21st Meeting, Warsaw, Jun. 19-26, 2015). The definition of the type of signal scheme herein is reused from the definition of the OETF number of VUI, and thus a value "18" is used to identify the HLG scheme. The OETF number included in VUI or SEI may be used as the control parameter for identifying the signal scheme. For example, a UHD-BD recorder may write the number "18" for the HLG scheme in the type of signal scheme in SEI while writing a value (for example, "1" or "14") permitted at present in the OETF number in VUI. In this case, an HDR-capable player or display can recognize an HLG video without violating the specification of the UHD-BD by preferentially referring parameters in SEI.

Figure 13:
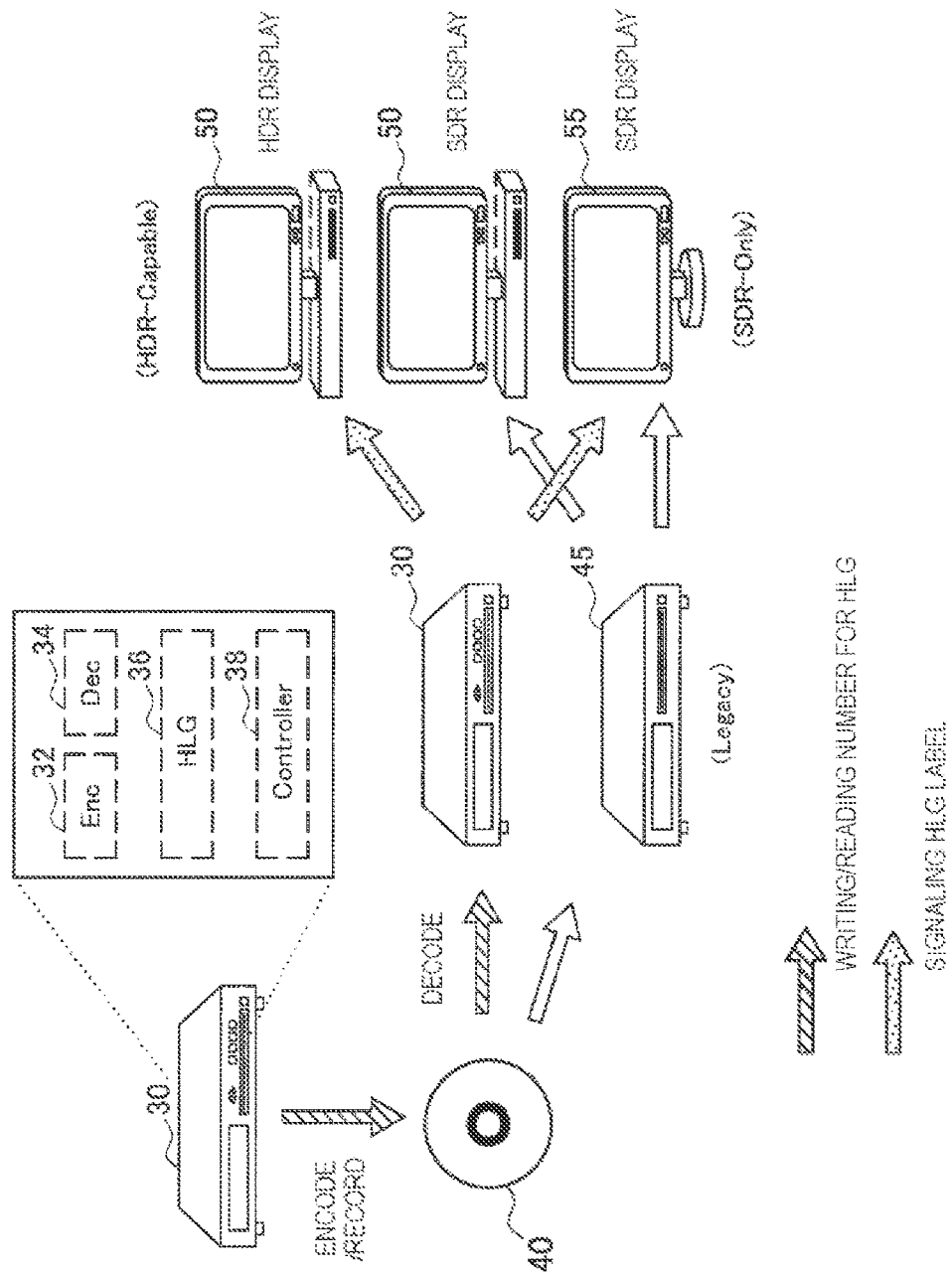
FIG. 13 is an explanatory diagram illustrating an example of a method of recording and reproducing an HLG video.

FIG. 13 is an explanatory diagram illustrating an example of a method of recording and reproducing an HLG video. FIG. 13 illustrates a recording apparatus 30 which is an HDR-capable recorder/player, a recording medium 40, a reproducing apparatus 45 which is an HDR-incapable player, a display apparatus 50 which is an HDR-capable display, and a display apparatus 55 which is an HDR-incapable display. The recording apparatus 30 includes an encoding unit 32, a decoding unit 34, an HLG processing unit 36, and a control unit 38.

The encoding unit 32 of the recording apparatus 30 encodes HLG image signals generated by the HLG processing unit 36 in conformity with HEVC and records an encoded bit stream on the recording medium 40 in conformity with UHD-BD. The control unit 38 writes the control parameter indicating the OETF number of the HLG scheme in VUI or SEI at the time of recording on the recording medium 40. VUI or SEI can be associated with the encoded bit stream including the compressed image signals. When the recording apparatus 30 attempts to reproduce a video, the control unit 38 recognizes that the video recorded on the recording medium 40 is an HLG video by reading the OETF number in VUI or SEI. The decoding unit 34 decodes the HLG image signals in conformity with HEVC.

The control unit 38 of the recording apparatus 30 may signal the decoded HLG image signals to a display of an output destination for the image signals along with an HLG label indicating that the image signals are HLG image signals. When the HLG label is received, the display apparatus 50 which is an HDR-capable display processes the image signals in conformity to the HLG scheme and displays an HDR video. The above-described image processing apparatus 100 can be mounted on, for example, the display apparatus 50 and can execute adjusting the above-described dynamic range before the HDR video is displayed. In a case in which the display of the output destination for the image signals is the HDR-incapable display apparatus 55, the display apparatus 55 displays the video in the SDR without noticing presence of the HLG label.

The HDR-incapable reproducing apparatus 45 does not read the OETF number in VUI or SEI at the time of reproduction of a video or ignores the OETF number since the read OETF number is an unknown value (or violates the restriction). The reproducing apparatus 45 outputs the image signals decoded in conformity with the HEVC to the display apparatus 50 or the display apparatus 55 without accompanying the HLG label. The display apparatus 50 displays the video in the SDR since the HLG label is not received. The display apparatus 55 also displays the video in the SDR.

Instead of the display apparatus 50, the HLG processing unit 36 of the recording apparatus 30 may have the function of the image processing apparatus 100 described above. In this case, the HLG processing unit 36 processes the decoded HLG image signals in conformity with the HLG scheme to generate the display signals for HDR video having a broad luminance dynamic range. Then, when the display signals are output to the display apparatus 50, the HDR video is displayed by the display apparatus 50.

4-2. Flow of Process (1) Recording Process

Figure 14:
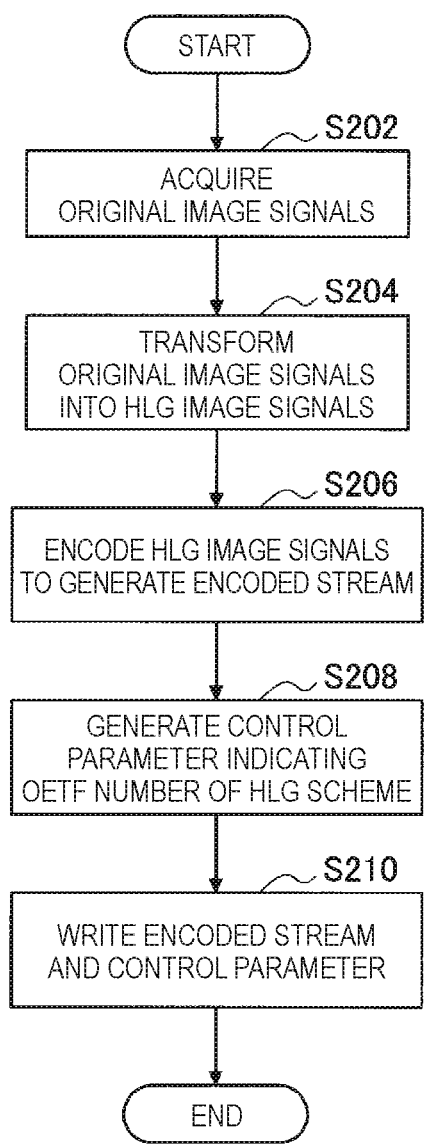
FIG. 14 is a flowchart illustrating an example of a flow of a recording process according to an embodiment.

FIG. 14 is a flowchart illustrating an example of a flow of a recording process executed by the recording apparatus 30 according to an embodiment. Referring to FIG. 14, the HLG processing unit 36 of the recording apparatus 30 first acquires original image signals linearly expressing light intensity of video content (step S202). Subsequently, the HLG processing unit 36 transforms the original image signals into the HLG image signals (step S204). Subsequently, the encoding unit 32 encodes the HLG image signals to generate an encoded stream (step S206). Subsequently, the control unit 38 generates the control parameter indicating the OETF number of the HLG scheme (step S208). Then, the control unit 38 records the encoded stream of the HLG image signals on a recording medium and writes the control parameter indicating the OETF number of the HLG scheme in VUI or SEI associated with the encoded stream (step S210).

(2) Reproducing Process—First Example

Figure 15A:
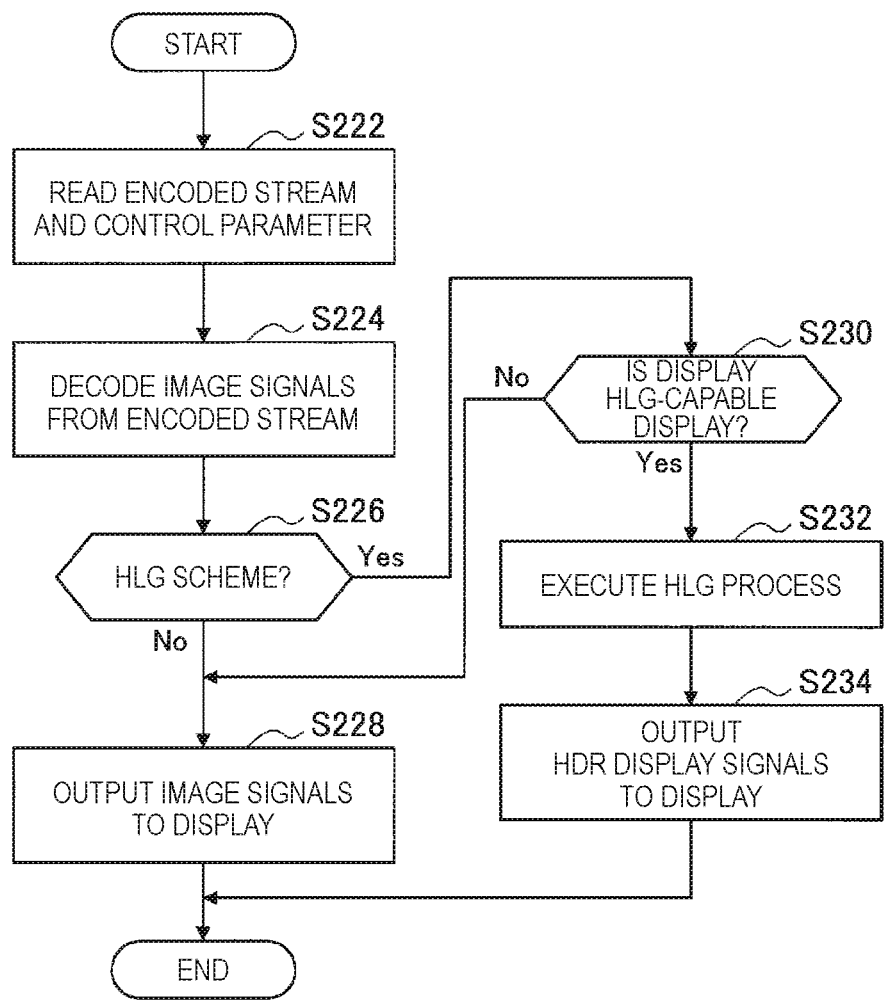
FIG. 15A is a flowchart illustrating a first example of a flow of a reproducing process according to an embodiment.

FIG. 15A is a flowchart illustrating a first example of a flow of a reproducing process according to an embodiment. Referring to FIG. 15A, the control unit 38 of the recording apparatus 30 first reads the encoded stream and the associated control parameter from the recording medium (step S222). Subsequently, the decoding unit 34 decodes the image signals from the read encoded stream (step S224). The control unit 38 determines whether the signal scheme of the image signals is the HLG scheme on the basis of the control parameter read in step S222 (step S226). For example, in a case in which the OETF number "18" for the HLG scheme is included in VUI or the OETF number in SEI is overwritten by "18" even when another OETF number is included in VUI, it can be determined that the signal scheme of the image signals is the HLG scheme. In a case in which image signals which are not the HLG image signals are decoded, the process proceeds to step S228 and non-HLG image signals are output to the display (step S228). In a case in which the HLG image signals are decoded, the process proceeds to step S230 and the control unit 38 further determines whether the display of the output destination is an HLG-capable display (step S230). In a case in which the display of the output destination is not the HLG-capable display, the image signals are output to the display without executing the HLG transformation (step S228). In a case in which the display of the output destination is the HLG-capable display, the HLG processing unit 36 processes the decoded image signal in conformity with the HLG scheme to generate the display signals having the broad luminance dynamic range (step S232). Then the display signals are output to the display (step S234).

(3) Reproducing Process—Second Example

Figure 15B:
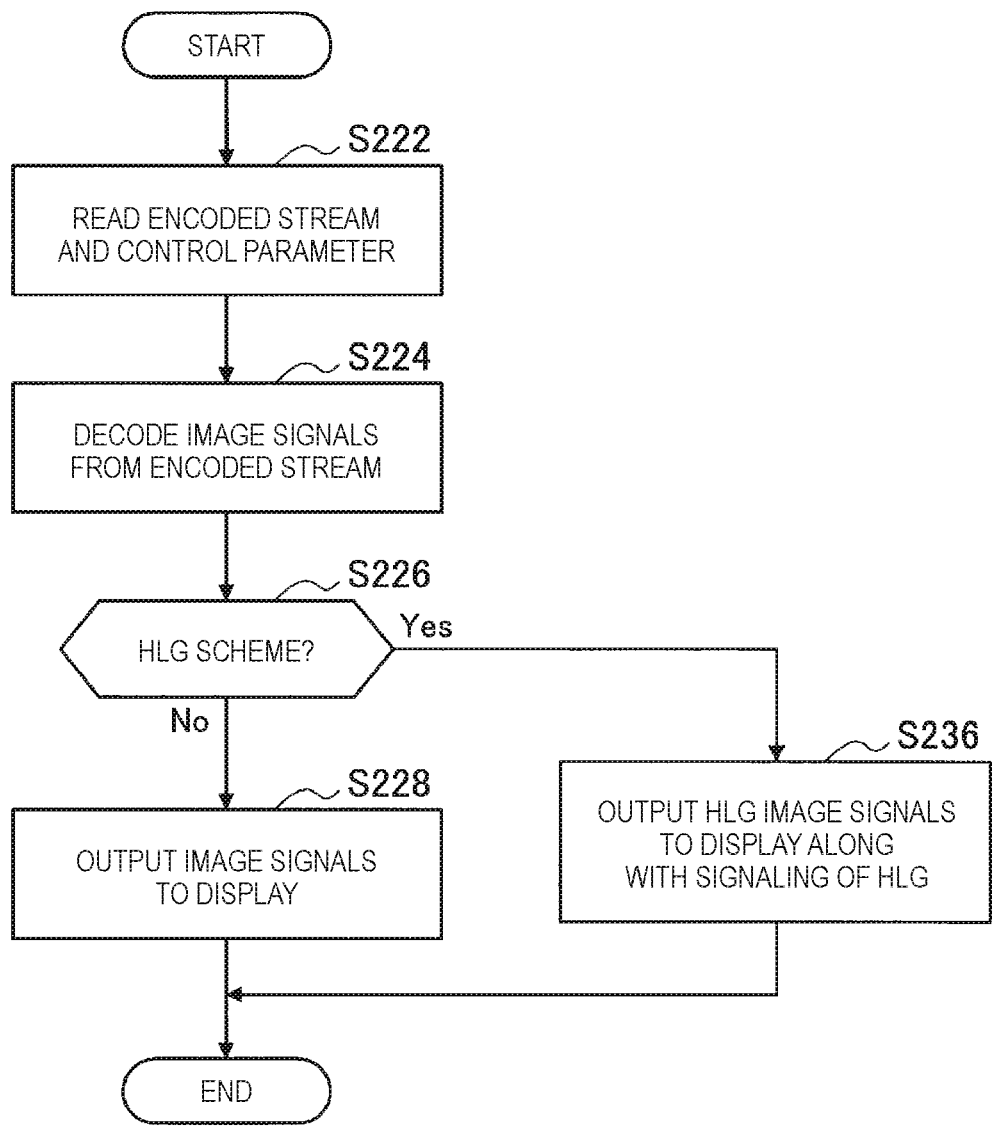
FIG. 15B is a flowchart illustrating a second example of a flow of a reproducing process according to an embodiment.

FIG. 15B is a flowchart illustrating a second example of the flow of the reproducing process according to an embodiment. Referring to FIG. 15B, the control unit 38 of the recording apparatus 30 first reads the encoded stream and the associated control parameter from the recording medium (step S222). Subsequently, the decoding unit 34 decodes the image signals from the read encoded stream (step S224). The control unit 38 determines whether the signal scheme of the image signals is the HLG scheme on the basis of the control parameter read in step S222 as in the first example (step S226). In a case in which the image signals which are not the HLG image signals are decoded, the process proceeds to step S228 and the non-HLG image signals are output to the display (step S228). In a case in which the HLG image signals are decoded, the process proceeds to step S236. Then, the control unit 38 outputs the HLG image signals to the display along with signaling of the HLG label (step S236).

4-3. Handling Complementary Stream

The video content can have not only the encoded stream of the image signals, audio signals, and control signals of a series of frames but also a complementary stream including subtitles information or graphics information. In a case in which the complementary stream is associated with the encoded stream of the image signals, the recording apparatus 30 which is an HDR-capable recorder/player adjusts luminance of content (for example, subtitles, GUI, or other display objects) of the complementary stream so that the maximum luminance level of the content matches the display luminance level (E'=0.5 in FIG. 2) of the reference white. This is contrast to match between the maximum luminance level of an SDR video and the maximum luminance level of the content of the complementary stream by the HDR-incapable reproducing apparatus 45 or the display apparatus 55. For example, if white of subtitles or GUI is displayed at the maximum luminance level of the HDR video (in a case in which headroom is not used, E'=1.0 in FIG. 2), the white is too bright, which rather impairs visibility. As described above, however, by aligning the maximum luminance level of the content of the complementary stream with the display luminance level of the reference white of the HDR video, it is possible to ensure appropriate visibility.

In this section, the recording and reproducing of the signals expressed in the HLG scheme have been mainly described, but the scheme described herein may also be applied to a case in which a signal scheme other than the HLG scheme for an HDR video is used.

5. EXAMPLE OF HARDWARE CONFIGURATION

The above-described embodiment can be realized using any of software, hardware, and a combination of software and hardware. In the case where software is used, a program that constitutes the software may be stored in, for example, a storage medium (a non-transitory media) provided inside or outside the apparatus in advance. Then, each program is read into, for example, a random access memory (RAM) for its execution and executed by a processor such as a central processing unit (CPU).

Figure 16:
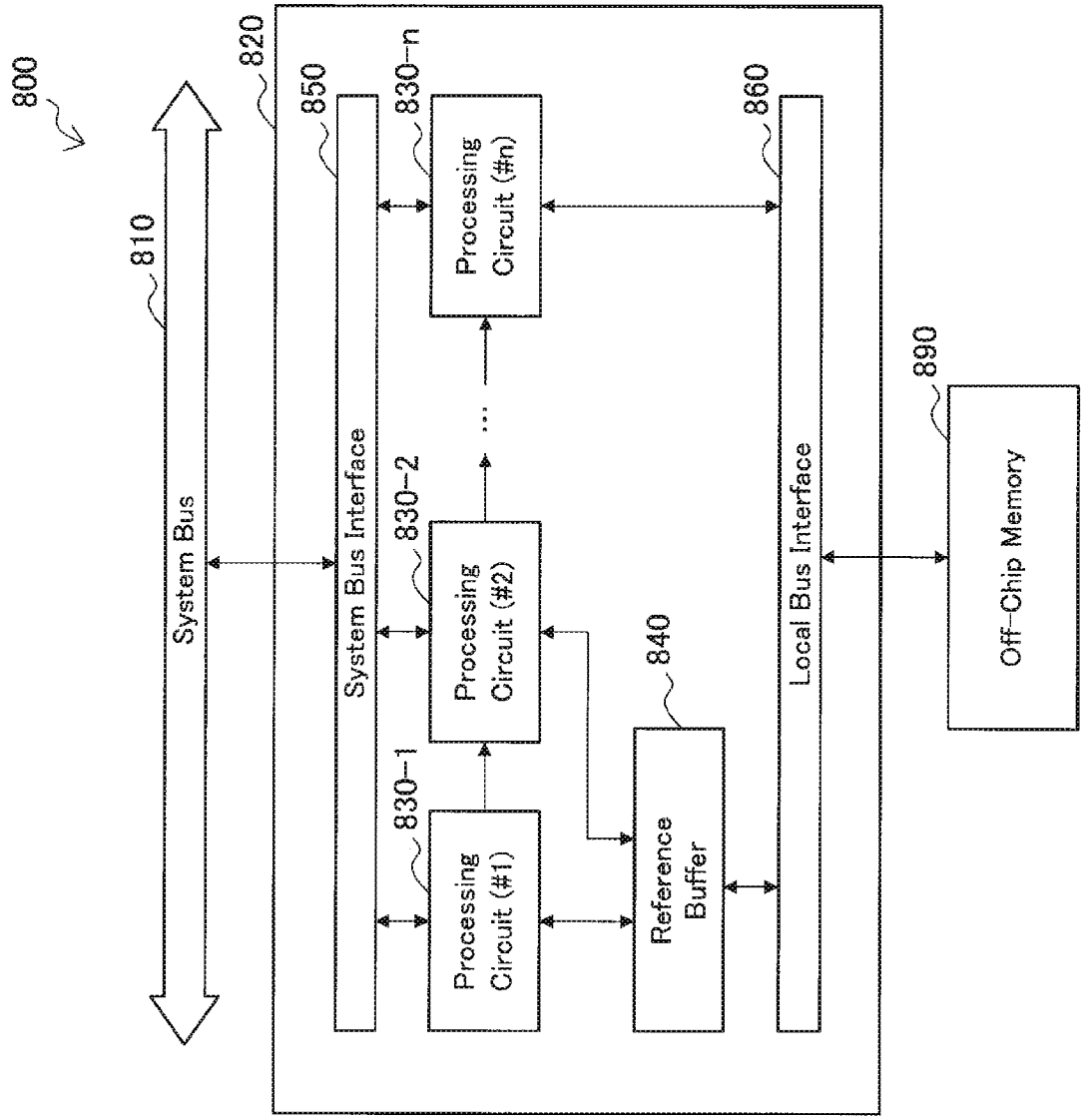
FIG. 16 is a block diagram illustrating an example of a hardware configuration of an apparatus.

FIG. 16 is a block diagram illustrating an example of a hardware configuration of an apparatus. Referring to FIG. 16, an image processing apparatus 800 has a system bus 810, an image processing chip 820, and an off-chip memory 890. The image processing chip 820 includes n (n is equal to or greater than 1) processing circuits 830-1, 830-2, . . . , and 830-*n*, a reference buffer 840, a system bus interface 850, and a local bus interface 860.

The system bus 810 provides a communication path between the image processing chip 820 and external modules (e.g., a central control function, an application function, a communication interface, a user interface, or a display interface, etc.). The processing circuits 830-1, 830-2, . . . , and 830-*n* are connected to the system bus 810 via the system bus interface 850 and to the off-chip memory 890 via the local bus interface 860. The processing circuits 830-1, 830-2, . . . , and 830-*n* can also access the reference buffer 840 that can correspond to an on-chip memory (e.g., an SRAM). The off-chip memory 890 may be, for example, a frame memory that stores image data processed by the image processing chip 820. For example, the processing circuit 830-1 can be used to adjust the luminance dynamic range of the HDR image signals and the processing circuit 830-2 can be used to encode or decode image signals in conformity with HEVC. Note that these processing circuits may also be formed on individual chips, rather than on the same image processing chip 820.

6. APPLICATION EXAMPLES

The above-described embodiments can be applied to various electronic apparatuses. Hereinafter, four application examples will be described.

(1) First Application Example

Figure 17:
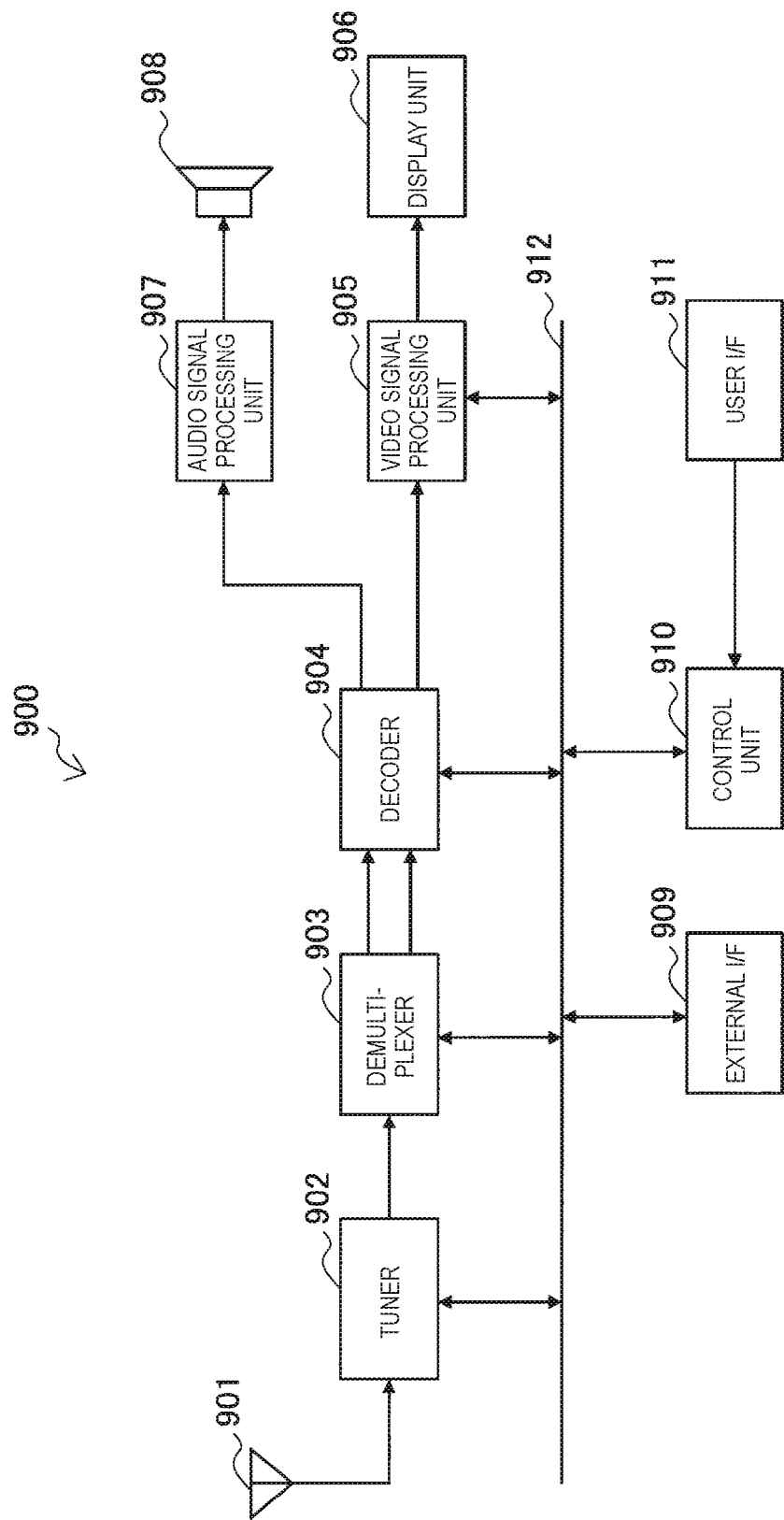
FIG. 17 is a block diagram illustrating an example of a schematic configuration of a television apparatus.

FIG. 17 illustrates an example of a schematic configuration of a television apparatus to which the above-described embodiment is applied. The television apparatus 900 has an antenna 901, a tuner 902, a demultiplexer 903, a decoder 904, a video signal processing unit 905, a display unit 906, an audio signal processing unit 907, a speaker 908, an external interface 909, a control unit 910, a user interface 911, and a bus 912.

The tuner 902 extracts a signal of a desired channel from a broadcasting signal received via the antenna 901 and demodulates the extracted signal. Then, the tuner 902 outputs an encoded bit stream obtained from the demodulation to the demultiplexer 903. That is, the tuner 902 plays a role as a transmission means of the television apparatus 900 which receives an encoded stream in which images are encoded.

The demultiplexer 903 demultiplexes a video stream and an audio stream of a program to be viewed from the encoded stream and outputs the demultiplexed streams to the decoder 904. In addition, the demultiplexer 903 extracts auxiliary data such as an electronic program guide (EPG) from the encoded bit stream and supplies the extracted data to the control unit 910. Note that, in the case where the encoded bit stream has been scrambled, the demultiplexer 903 may perform descrambling.

The decoder 904 decodes the video stream and the audio stream input from the demultiplexer 903. Then, the decoder 904 outputs video data generated from the decoding process to the video signal processing unit 905. In addition, the decoder 904 outputs audio data generated from the decoding process to the audio signal processing unit 907.

The video signal processing unit 905 reproduces the video data input from the decoder 904 to cause the display unit 906 to display a video. In addition, the video signal processing unit 905 may cause the display unit 906 to display an application screen supplied via a network. Furthermore, the video signal processing unit 905 may perform an additional process, for example, noise reduction, on the video data in accordance with a setting. Moreover, the video signal processing unit 905 may generate an image of a graphical user interface (GUI), for example, a menu, a button, or a cursor and superimpose the generated image on an output image.

The display unit 906 is driven with a driving signal supplied from the video signal processing unit 905 and displays a video or an image on a video plane of a display device (e.g., a liquid crystal display, a plasma display, an OLED, etc.).

The audio signal processing unit 907 performs a reproduction process including D/A conversion and amplification on the audio data input from the decoder 904 and causes the speaker 908 to output a sound. In addition, the audio signal processing unit 907 may perform an additional process such as noise removal on the audio data.

The external interface 909 is an interface for connecting the television apparatus 900 to an external apparatus or a network. For example, a video stream or an audio stream received via the external interface 909 may be decoded by the decoder 904. In other words, the external interface 909 also plays the role as a transmission means of the television apparatus 900 which receives an encoded stream in which images are encoded.

The control unit 910 has a processor such as a central processing unit (CPU) and a memory such as a random access memory (RAM) and a read only memory (ROM). The memory stores a program executed by the CPU, program data, EPG data, and data acquired via a network. The program stored in the memory is read and executed by the CPU at the time of, for example, start-up of the television apparatus 900. The CPU controls operations of the television apparatus 900 by executing the program in response to, for example, operation signals input from the user interface 911.

The user interface 911 is connected to the control unit 910. The user interface 911 includes, for example, buttons and switches with which a user operates the television apparatus 900, a reception unit for remote control signals, and the like. The user interface 911 generates an operation signal by detecting an operation by a user via any aforementioned constituent element and outputs the generated operation signal to the control unit 910.

The bus 912 connects the tuner 902, the demultiplexer 903, the decoder 904, the video signal processing unit 905, the audio signal processing unit 907, the external interface 909, and the control unit 910 to one another.

In the television apparatus 900 that has the configuration, the video signal processing unit 905 has the function of the image processing apparatus 100 according to the above-described embodiment. Accordingly, in the television apparatus 900, it is possible to resolve or at least reduce trouble related to the mismatch between a dynamic range of a video signal and peak luminance of a display when an HDR video is reproduced.

(2) Second Application Example

Figure 18:
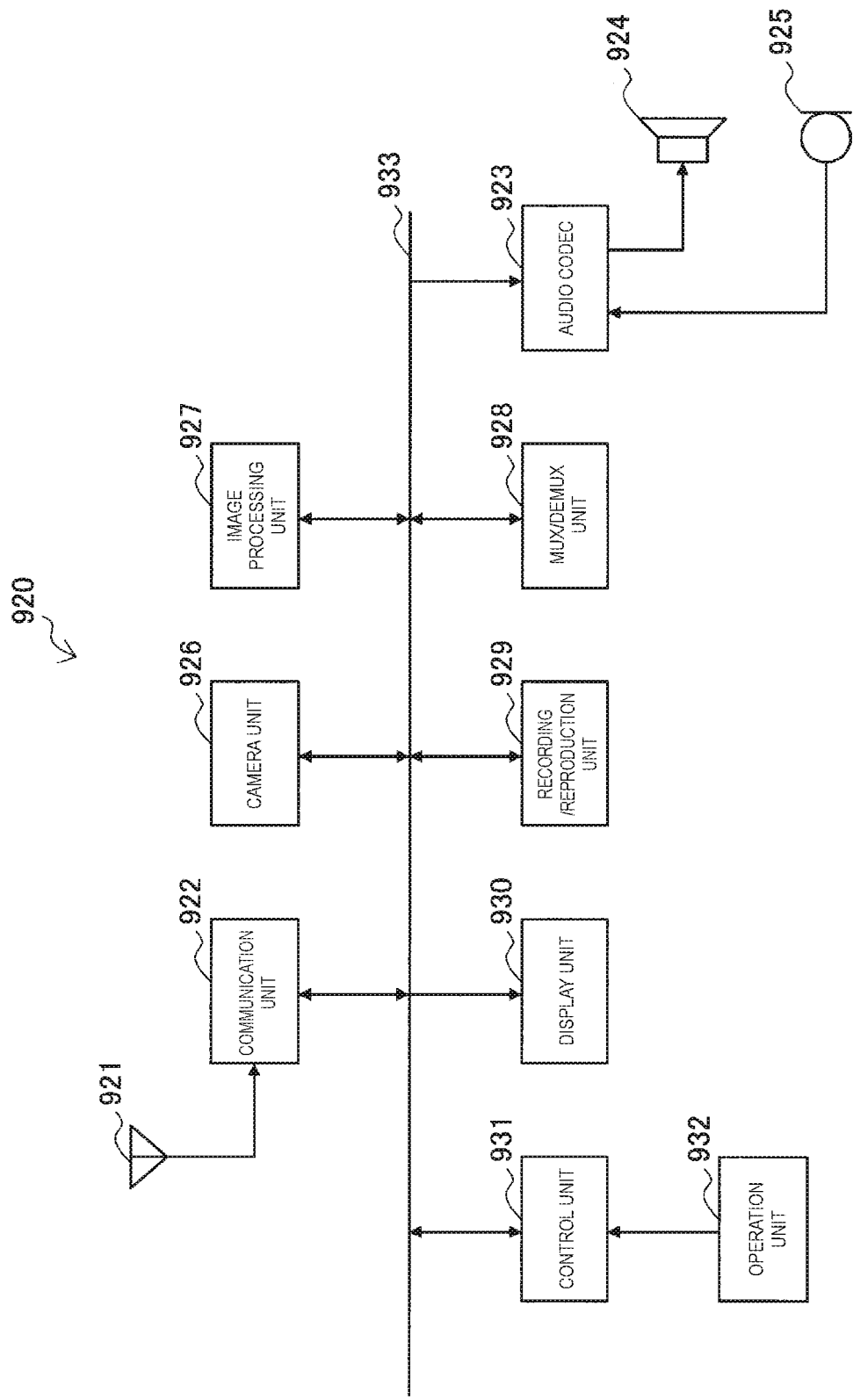
FIG. 18 is a block diagram illustrating an example of a schematic configuration of a mobile phone.

FIG. 18 illustrates an example of a schematic configuration of a mobile telephone to which the above-described embodiments are applied. A mobile telephone 920 includes an antenna 921, a communication unit 922, an audio codec 923, a speaker 924, a microphone 925, a camera unit 926, an image processing unit 927, a multiplexing/demultiplexing unit 928, a recording/reproducing unit 929, a display unit 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 mutually connects the communication unit 922, the audio codec 923, the camera unit 926, the image processing unit 927, the multiplexing/demultiplexing unit 928, the recording/reproducing unit 929, the display unit 930, and the control unit 931.

The mobile telephone 920 performs actions such as transmitting/receiving an audio signal, transmitting/receiving an electronic mail or image data, capturing an image, and recording data in various operation modes including an audio call mode, a data communication mode, an imaging mode, and a videophone mode.

In the audio call mode, an analog audio signal generated by the microphone 925 is supplied to the audio codec 923. The audio codec 923 then converts the analog audio signal into audio data, performs A/D conversion on the converted audio data, and compresses the data. The audio codec 923 thereafter outputs the compressed audio data to the communication unit 922. The communication unit 922 encodes and modulates the audio data to generate a transmission signal. The communication unit 922 then transmits the generated transmission signal to a base station (not shown) through the antenna 921. Furthermore, the communication unit 922 amplifies a radio signal received through the antenna 921, performs frequency conversion, and acquires a reception signal. The communication unit 922 thereafter demodulates and decodes the reception signal to generate the audio data and output the generated audio data to the audio codec 923. The audio codec 923 expands the audio data, performs D/A conversion on the data, and generates the analog audio signal. The audio codec 923 then supplies the generated audio signal to the speaker 924 to cause it to output the audio.

In the data communication mode, for example, the control unit 931 generates character data configuring an electronic mail, in accordance with a user operation detected through the operation unit 932. The control unit 931 further displays characters on the display unit 930. Moreover, the control unit 931 generates electronic mail data in accordance with an instruction to send it obtained from a user through the operation unit 932 and outputs the generated electronic mail data to the communication unit 922. The communication unit 922 encodes and modulates the electronic mail data to generate a transmission signal. Then, the communication unit 922 transmits the generated transmission signal to the base station (not shown) through the antenna 921. The communication unit 922 further amplifies a radio signal received through the antenna 921, performs frequency conversion, and acquires a reception signal. The communication unit 922 thereafter demodulates and decodes the reception signal, restores the electronic mail data, and outputs the restored electronic mail data to the control unit 931. The control unit 931 displays the content of the electronic mail on the display unit 930 as well as stores the electronic mail data in a storage medium of the recording/reproducing unit 929.

The recording/reproducing unit 929 includes an arbitrary storage medium that is readable and writable. For example, the storage medium may be a built-in storage medium such as a RAM or a flash memory, or may be an externally-mounted storage medium such as a hard disk, a magnetic disk, a magneto-optical disk, an optical disk, a USB memory, or a memory card.

In the imaging mode, for example, the camera unit 926 images an object to generate image data and outputs the generated image data to the image processing unit 927. The image processing unit 927 encodes the image data input from the camera unit 926 and stores an encoded stream in the storage medium of the recording/reproducing unit 929.

In the videophone mode, for example, the multiplexing/demultiplexing unit 928 multiplexes a video stream encoded by the image processing unit 927 and an audio stream input from the audio codec 923, and outputs the multiplexed stream to the communication unit 922. The communication unit 922 encodes and modulates the stream to generate a transmission signal. The communication unit 922 then transmits the generated transmission signal to the base station (not shown) through the antenna 921. Moreover, the communication unit 922 amplifies a radio signal received through the antenna 921, performs frequency conversion, and acquires a reception signal. The transmission signal and the reception signal can include an encoded bit stream. The communication unit 922 thus demodulates and decodes the reception signal to restore the stream, and outputs the restored stream to the multiplexing/demultiplexing unit 928. The multiplexing/demultiplexing unit 928 demultiplexes the video stream and the audio stream from the input stream and outputs the video stream and the audio stream to the image processing unit 927 and the audio codec 923, respectively. The image processing unit 927 decodes the video stream to generate video data. The video data is then supplied to the display unit 930, which displays a series of images. The audio codec 923 expands and performs D/A conversion on the audio stream to generate an analog audio signal. The audio codec 923 then supplies the generated audio signal to the speaker 924 to cause it to output the audio.

In the mobile telephone 920 that has the configuration, the image processing unit 927 has the function of the image processing apparatus 100 according to the above-described embodiment. Accordingly, in the mobile telephone 920, it is possible to resolve or at least reduce trouble related to the mismatch between a dynamic range of a video signal and peak luminance of a display when an HDR video is reproduced.

(3) Third Application Example

Figure 19:
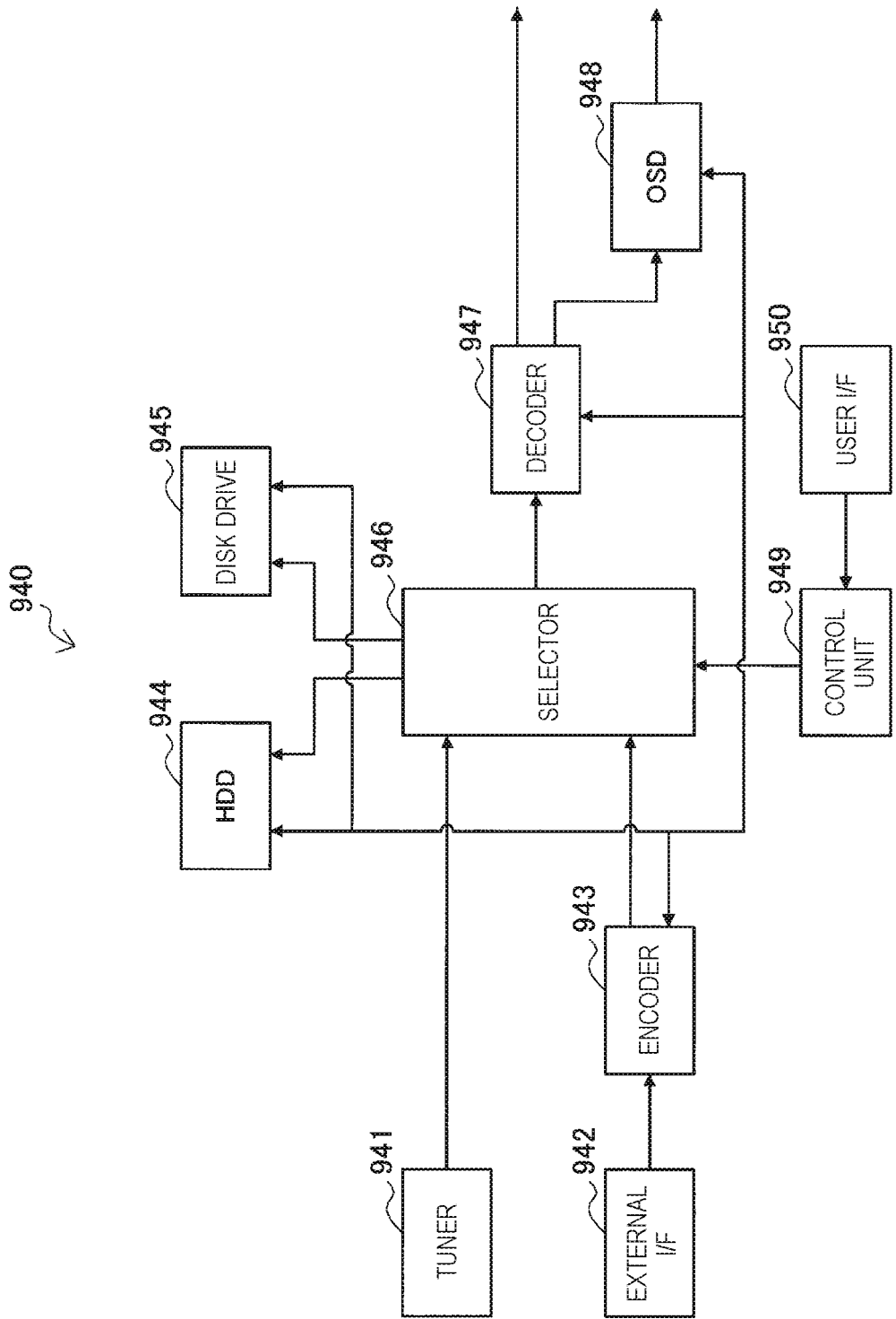
FIG. 19 is a block diagram illustrating an example of a schematic configuration of a recording/reproduction device.

FIG. 19 illustrates an example of a schematic configuration of a recording/reproducing apparatus to which the above-described embodiments are applied. The recording/reproducing apparatus 940 encodes audio data and video data of a received broadcast program and records the data into a recording medium, for example. The recording/reproducing apparatus 940 may also encode audio data and video data acquired from another apparatus and record the data into the recording medium, for example. The recording/reproducing apparatus 940 reproduces the data recorded in the recording medium on a monitor and a speaker, for example, in response to a user instruction. In this case, recording/reproducing apparatus 940 decodes the audio data and the video data.

The recording/reproducing apparatus 940 includes a tuner 941, an external interface 942, an encoder 943, a hard disk drive (HDD) 944, a disk drive 945, a selector 946, a decoder 947, an on-screen display (OSD) 948, a control unit 949, and a user interface 950.

The tuner 941 extracts a signal of a desired channel from a broadcast signal received through an antenna (not shown) and demodulates the extracted signal. The tuner 941 then outputs an encoded bit stream obtained by the demodulation to the selector 946. That is, the tuner 941 has a role as transmission means in the recording/reproducing apparatus 940.

The external interface 942 is an interface which connects the recording/reproducing apparatus 940 with an external device or a network. The external interface 942 may be, for example, an IEEE 1394 interface, a network interface, a USB interface, or a flash memory interface. The video data and the audio data received through the external interface 942 are input to the encoder 943, for example. That is, the external interface 942 has a role as transmission means in the recording/reproducing apparatus 940.

The encoder 943 encodes the video data and the audio data in the case where the video data and the audio data input from the external interface 942 are not encoded. The encoder 943 thereafter outputs an encoded bit stream to the selector 946.

The HDD 944 records, into an internal hard disk, the encoded bit stream in which content data such as video and audio is compressed, various programs, and other data. The HDD 944 reads these data from the hard disk when the video and the audio are reproduced.

The disk drive 945 records and reads data into/from a recording medium attached to the disk drive. The recording medium attached to the disk drive 945 may be, for example, a DVD disk (such as DVD-Video, DVD-RAM, DVD-R, DVD-RW, DVD+R, or DVD+RW) or a Blu-ray (Registered Trademark) disk.

The selector 946 selects the encoded bit stream input from the tuner 941 or the encoder 943 when recording the video and audio, and outputs the selected encoded bit stream to the HDD 944 or the disk drive 945. When reproducing the video and audio, on the other hand, the selector 946 outputs the encoded bit stream input from the HDD 944 or the disk drive 945 to the decoder 947.

The decoder 947 decodes the encoded bit stream to generate the video data and the audio data. The decoder 904 then outputs the generated video data to the OSD 948 and the generated audio data to an external speaker.

The OSD 948 reproduces the video data input from the decoder 947 and displays the video. The OSD 948 may also superpose an image of a GUI such as a menu, buttons, or a cursor onto the displayed video.

The control unit 949 includes a processor such as a CPU and a memory such as a RAM and a ROM. The memory stores a program executed by the CPU as well as program data. The program stored in the memory is read by the CPU at the start-up of the recording/reproducing apparatus 940 and executed, for example. By executing the program, the CPU controls the operation of the recording/reproducing apparatus 940 in accordance with an operation signal that is input from the user interface 950, for example.

The user interface 950 is connected to the control unit 949. The user interface 950 includes a button and a switch for a user to operate the recording/reproducing apparatus 940 as well as a reception part which receives a remote control signal, for example. The user interface 950 detects a user operation through these components to generate an operation signal, and outputs the generated operation signal to the control unit 949.

In the recording/reproducing apparatus 940 that has the configuration, the OSD 948 has the function of the image processing apparatus 100 according to the above-described embodiment. Accordingly, in the recording/reproducing apparatus 940, it is possible to resolve or at least reduce trouble related to the mismatch between a dynamic range of a video signal and peak luminance of a display when an HDR video is reproduced.

(4) Fourth Application Example

Figure 20:
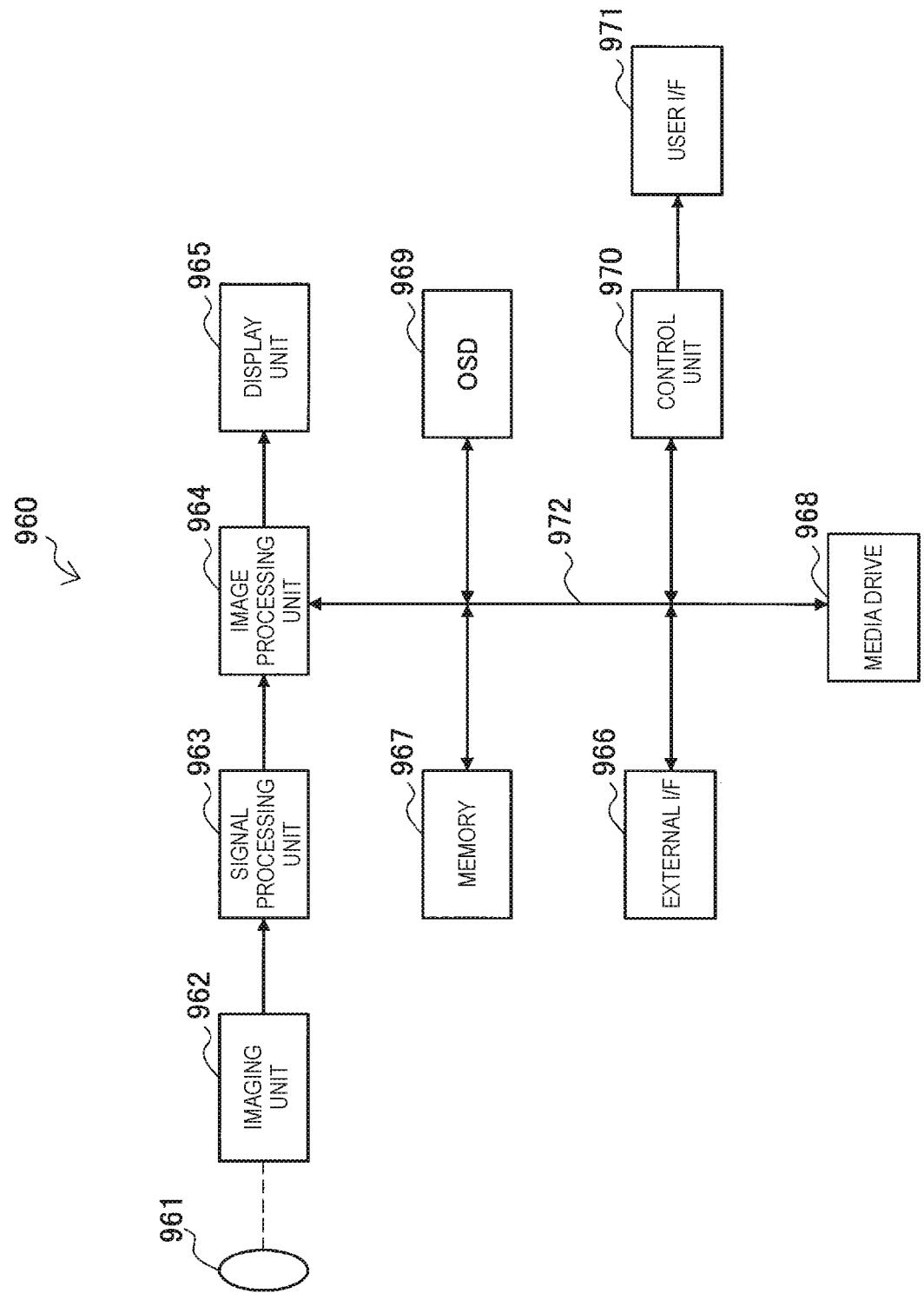
FIG. 20 is a block diagram illustrating an example of a schematic configuration of an imaging apparatus.

FIG. 20 illustrates an example of a schematic configuration of an imaging apparatus to which the above-described embodiments are applied. The imaging apparatus 960 images an object to generate an image, encodes image data, and records the data into a recording medium.

The imaging apparatus 960 includes an optical block 961, an imaging unit 962, a signal processing unit 963, an image processing unit 964, a display unit 965, an external interface 966, a memory 967, a media drive 968, an OSD 969, a control unit 970, a user interface 971, and a bus 972.

The optical block 961 is connected to the imaging unit 962. The imaging unit 962 is connected to the signal processing unit 963. The display unit 965 is connected to the image processing unit 964. The user interface 971 is connected to the control unit 970. The bus 972 mutually connects the image processing unit 964, the external interface 966, the memory 967, the media drive 968, the OSD 969, and the control unit 970.

The optical block 961 includes a focus lens and a diaphragm mechanism. The optical block 961 forms an optical image of an object on an imaging plane of the imaging unit 962. The imaging unit 962 includes an image sensor such as a CCD (Charge Coupled Device) or a CMOS (Complementary Metal Oxide Semiconductor) and performs photoelectric conversion to convert the optical image formed on the imaging plane into an image signal as an electric signal. Then, the imaging unit 962 outputs the image signal to the signal processing unit 963.

The signal processing unit 963 performs various camera signal processes such as a knee correction, a gamma correction and a color correction on the image signal input from the imaging unit 962. The signal processing unit 963 outputs the image data, on which the camera signal processes have been performed, to the image processing unit 964.

The image processing unit 964 encodes the image data input from the signal processing unit 963 and generates the encoded data. The image processing unit 964 then outputs the generated encoded data to the external interface 966 or the media drive 968. The image processing unit 964 also decodes the encoded data input from the external interface 966 or the media drive 968 to generate image data. The image processing unit 964 then outputs the generated image data to the display unit 965. Moreover, the image processing unit 964 may output to the display unit 965 the image data input from the signal processing unit 963 to cause the display unit 965 to display the image. Furthermore, the image processing unit 964 may superpose display data acquired from the OSD 969 onto the image that is output on the display unit 965.

The OSD 969 generates an image of a GUI such as a menu, buttons, or a cursor and outputs the generated image to the image processing unit 964.

The external interface 966 is configured as a USB input/output terminal, for example. The external interface 966 connects the imaging apparatus 960 with a printer when printing an image, for example. Moreover, a drive is connected to the external interface 966 as needed. A removable medium such as a magnetic disk or an optical disk is attached to the drive, for example, so that a program read from the removable medium can be installed to the imaging apparatus 960. The external interface 966 may also be configured as a network interface that is connected to a network such as a LAN or the Internet. That is, the external interface 966 has a role as transmission means in the imaging apparatus 960.

The recording medium attached to the media drive 968 may be an arbitrary removable medium that is readable and writable such as a magnetic disk, a magneto-optical disk, an optical disk, or a semiconductor memory. Furthermore, the recording medium may be attached to the media drive 968 in a fixed manner so that a non-transportable storage unit such as a built-in hard disk drive or a solid state drive (SSD) is configured, for example.

The control unit 970 includes a processor such as a CPU and a memory such as a RAM and a ROM. The memory stores a program executed by the CPU as well as program data. The program stored in the memory is read by the CPU at the start-up of the imaging apparatus 960 and then executed. By executing the program, the CPU controls the operation of the imaging apparatus 960 in accordance with an operation signal that is input from the user interface 971, for example.

The user interface 971 is connected to the control unit 970. The user interface 971 includes buttons and switches for a user to operate the imaging apparatus 960, for example. The user interface 971 detects a user operation through these components to generate an operation signal, and outputs the generated operation signal to the control unit 970.

In the imaging apparatus 960 that has the configuration, the image processing unit 964 has the function of the image processing apparatus 100 according to the above-described embodiment. Accordingly, in the imaging apparatus 960, it is possible to resolve or at least reduce trouble related to the mismatch between a dynamic range of a video signal and peak luminance of a display when an HDR video is reproduced.

7. CONCLUSION

The embodiment of the technology according to the present disclosure has been described above with reference to FIGS. 1 to 20. According to the above-described embodiment, the image signals based on the signal scheme of fixedly handing the display luminance level of the reference white is subjected to the gamma transformation to be transformed into the display signals. The gamma transformation is executed using the parameter decided on the basis of the peak luminance level of the display so that the display luminance level of the reference white is maintained. Accordingly, it is possible to avoid occurrence of a loss (so-called halation) of information of a high-luminance region caused by luminance clipping (or excessively strong roll-off) and it is possible to appropriately reproduce luminance of the reference white considered as a reference of lightness at the time of imaging or producing of content even when content is displayed.

According to a certain embodiment, signals normalized at the luminance level of the reference white is subjected to the gamma transformation using the first gamma value decided so that the maximum luminance level expressible by display signals is aligned with a peak luminance level of a display. In this case, the luminance level of the reference white is not transformed through the gamma transformation. In such a first transformation method, it is possible to avoid a loss of information in a high-luminance region and it is possible to use a range up to the peak luminance of the display without waste.

According to a certain embodiment, signals normalized at the luminance level of the reference white is subjected to the linear transformation using a gain value decided so that the maximum luminance level expressible by the display signals is aligned with a peak luminance level of a display. The image signals subjected to the linear transformation are subjected to the gamma transformation using a second gamma value decided so that the display luminance level of the reference white is restored to an original luminance level. In this case, the luminance level of the reference white is finally maintained to be the original level (although the luminance level of the reference white is changed during calculation). The gamma transformation in which the second gamma value is used can be executed such that the maximum luminance level expressible by the display signals is not changed. The linear transformation in which a gain value is used and the gamma transformation in which both ends of a dynamic range are fixed have already been mounted individually as general calculation functions in many cases. Therefore, such a second transformation method can be realized at relatively low cost without additionally mounting a new calculation function. The second transformation method may be executed after the gamma transformation is executed on the image signals using a predetermined system gamma value. For example, by using a system gamma value of 1.2, it is possible to allow grayscale of luminance in a video to be displayed to be close to display based on an existing specification such as ITU-R BT.1886. The above-described first and second transformation methods may be selectively switched. Thus, it is possible to provide diverse expressions of an HDR video to a user and select an optimum expression in accordance with characteristics of a display.

According to a certain embodiment, an operation mode is switched between the first operation mode in which the display luminance level of the reference white is maintained and the second operation mode in which the display luminance level of the reference white is not maintained. By providing the operation modes, a user or a device may adaptively select whether to prefer to reproduce the luminance of the reference white at the time of display of an HDR video. For example, the operation mode may be selected on a basis of a type of signal scheme. In this case, for example, maintenance of the level of the reference white at the time of generation of the image signals in conformity with the HLG scheme of relatively expressing the luminance level using a level of the reference white as a reference and non-maintenance of the level of the reference white otherwise can be switched. In a case in which the image signals are decoded from an encoded stream encoded in conformity to the HEVC scheme, the type of signal scheme can be determined on the basis of, for example, the control parameter included in video usability information (VUI) or supplemental enhancement information (SEI). The operation mode may be selected on the basis of the user setting. For example, a user who desires to reproduce lightness of an imaging environment or a content production environment will select the first operation mode. The operation mode may also be selected on a basis of another factor, such as a peak luminance level as performance of a display or a peak luminance level automatically set from a condition of a display environment.

In a case in which the second operation mode is selected, the simple linear transformation may be executed using the gain value. In this case, occurrence of a loss of the information of the high-luminance region caused by luminance clipping is avoided. In addition, particularly, in a case in which the peak luminance of the display is low, SDR display in conformity with ITU-R BT.1886 may be executed. In this case, it is possible to obtain a video with good visibility in an intermediate-luminance region.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An image processing apparatus including:

a transformation unit configured to transform image signals based on a signal scheme of fixedly handling a display luminance level of reference white into display signals by executing gamma transformation so that the display luminance level of the reference white is maintained using a parameter decided on a basis of a peak luminance level of a display.

(2)

The image processing apparatus according to (1), in which the image signals are signals normalized at a luminance level of the reference white, and the transformation unit executes the gamma transformation on the image signals using a first gamma value.

(3)

The image processing apparatus according to (2), in which the transformation unit decides the first gamma value so that a maximum luminance level expressible by the display signals is aligned with the peak luminance level of the display.

(4)

The image processing apparatus according to (1), in which the image signals are signals normalized at a luminance level of the reference white, and the transformation unit executes linear transformation on the image signals using a gain value and executes the gamma transformation on the image signals subjected to the linear transformation using a second gamma value decided so that the display luminance level of the reference white is restored to an original luminance level.

(5)

The image processing apparatus according to (4), in which the transformation unit decides the gain value so that a maximum luminance level expressible by the display signals is aligned with the peak luminance level of the display.

(6)

The image processing apparatus according to (4) or (5), in which the transformation unit executes the gamma transformation using the second gamma value so that a maximum luminance level expressible by the display signals is not changed.

(7)

The image processing apparatus according to any one of (4) to (6), in which the transformation unit executes the linear transformation and the gamma transformation using the second gamma value after the gamma transformation is executed on the image signals using a predetermined system gamma value.

(8)

The image processing apparatus according to any one of (1) to (7), further including:

a control unit configured to select a mode to be used by the transformation unit between a first operation mode in which the display luminance level of the reference white is maintained and a second operation mode in which the display luminance level of the reference white is not maintained, in which the transformation unit transforms the image signals into the display signals so that the display luminance level of the reference white is maintained in a case in which the first operation mode is selected by the control unit.

(9)

The image processing apparatus according to (8), in which the control unit selects one of the first and second operation modes on a basis of one or more of conditions of a type of signal scheme, a user setting, an attribute of the display, and a display environment.

(10)

The image processing apparatus according to any one of (1) to (9), in which the transformation unit selectively uses a first transformation method of executing the gamma transformation on the image signals so that the display luminance level of the reference white is not changed, and a second transformation method of executing linear transformation on the image signals using a gain value and executing the gamma transformation on the image signals subjected to the linear transformation using a second gamma value decided so that the display luminance level of the reference white is restored to an original luminance level.

(11)

The image processing apparatus according to (8) or (9), in which the transformation unit executes linear transformation on the image signals using a gain value decided so that a maximum luminance level expressible by the display signals is aligned with the peak luminance level of the display in a case in which the second operation mode is selected by the control unit.

(12)

The image processing apparatus according to (8) or (9), in which the transformation unit transforms the image signals into the display signals in conformity with ITU-R BT.1886 in a case in which the second operation mode is selected by the control unit.

(13)

The image processing apparatus according to any one of (1) to (12), in which the signal scheme is a hybrid log gamma (HLG) scheme based on a combination of a gamma curve at a luminance level lower than the reference white and a logarithmic curve at a luminance level higher than the reference white.

(14)

The image processing apparatus according to (13), in which the image signals are decoded from an encoded stream encoded in conformity with a high efficiency video coding (HEVC) scheme, and it is determined that the HLG scheme is used for the image signals on a basis of a parameter included in supplemental enhancement information (SEI) associated with the encoded stream.

(15)

The image processing apparatus according to (13), in which the image signals include an encoded stream encoded in conformity with a high efficiency video coding (HEVC) scheme, and it is determined that the HLG scheme is used for the image signals on a basis of a parameter included in video usability information (VUI) associated with the encoded stream.

(16)

The image processing apparatus according to (14) or (15), in which, in a case in which a complementary stream including subtitle information or graphics information is associated with the encoded stream, a maximum luminance level of content of the complementary stream is adjusted to be aligned with the display luminance level of the reference white.

(17)

An image processing method performed by an image processing apparatus, the method including:

transforming image signals based on a signal scheme of fixedly handling a display luminance level of reference white into display signals by executing gamma transformation so that the display luminance level of the reference white is maintained using a parameter decided on a basis of a peak luminance level of a display.

REFERENCE SIGNS LIST 10 imaging apparatus
20 network
30 recording apparatus (HDR-capable)
40 recording medium
45 reproducing apparatus (HDR-incapable)
50 display apparatus (HDR-capable)
55 display apparatus (HDR-incapable)
100 image processing apparatus
110 image acquisition unit
120 transformation unit
130 control unit

The invention claimed is:

1. An image processing apparatus, comprising:
a central processing unit (CPU) configured to:
transform image signals into display signals based on gamma transformation of the image signals, wherein a value of a display luminance level of a reference white is constant based on a first parameter,
the first parameter is based on a peak luminance level of a display element,
the image signals are based on a hybrid log gamma (HLG) scheme that includes a fixedly handling process of the display luminance level of the reference white,
the HLG scheme is based on a combination of
a gamma curve at a luminance level lower than the display luminance level of the reference white, and
a logarithmic curve at a luminance level higher than the display luminance level of the reference white.

2. The image processing apparatus according to claim 1, wherein
the image signals are normalized at the display luminance level of the reference white, and
the gamma transformation on the image signals is based on a first gamma value.

3. The image processing apparatus according to claim 2, wherein the CPU is further configured to determine the first gamma value such that a maximum luminance level of the display signals is in alignment with the peak luminance level of the display element.

4. The image processing apparatus according to claim 1, wherein
the image signals are normalized at the display luminance level of the reference white, and
the CPU is further configured to:
execute linear transformation on the image signals based on a gain value,
determine a second gamma value to restore the display luminance level of the reference white to an original luminance level of the reference white, and
execute the gamma transformation on the image signals subjected to the linear transformation, wherein the gamma transformation is executed on the image signals based on the second gamma value.

5. The image processing apparatus according to claim 4, wherein the CPU is further configured to determine the gain value such that a maximum luminance level of the display signals is in alignment with the peak luminance level of the display element.

6. The image processing apparatus according to claim 4, wherein
a value of a maximum luminance level of the display signals is constant based on the second gamma value.

7. The image processing apparatus according to claim 4, wherein
the CPU is further configured to execute the linear transformation and the gamma transformation, and
the execution of the gamma transformation on the image signals is further based on the second gamma value and system gamma value.

8. The image processing apparatus according to claim 1, wherein
the CPU is further configured to select one of a first operation mode or a second operation mode for the transformation of the image signals, and
in the first operation mode, the value of the display luminance level of the reference white is constant.

9. The image processing apparatus according to claim 8, wherein the CPU is further configured to select one of the first operation mode or the second operation mode based on one of a type of the HLG scheme, a user setting, an attribute of the display element, or an environment of the display element.

10. The image processing apparatus according to claim 8, wherein the CPU is further configured to:
determine a gain value such that a maximum luminance level of the display signals is in alignment with the peak luminance level of the display element; and
execute linear transformation on the image signals based on the selection of the second operation mode and the gain value.

11. The image processing apparatus according to claim 8, wherein the CPU is further configured to transform the image signals into the display signals in conformity with ITU-R BT.1886 based on the selection of the second operation mode.

12. The image processing apparatus according to claim 1, wherein
the CPU is further configured to select one of a first transformation or a second transformation,
the first transformation corresponds to the gamma transformation on the image signals such that the value of the display luminance level of the reference white is constant,
the second transformation corresponds to a linear transformation on the image signals based on a gain value and the gamma transformation on the image signals subjected to the linear transformation, in the second transformation, the CPU is further configured to determine a gamma value to restore the display luminance level of the reference white to an original luminance level of the reference white, and the gamma transformation is executed on the image signals based on the gamma value.

13. The image processing apparatus according to claim 1, wherein the image signals are decoded from an encoded stream, the encoded stream is encoded in conformity with a high efficiency video coding (HEVC) scheme, the HLG scheme for the image signals is further based on a second parameter, and supplemental enhancement information (SEI) associated with the encoded stream includes the second parameter.

14. The image processing apparatus according to claim 13, wherein the CPU is further configured to:

align a maximum luminance level of content of a complementary stream with the display luminance level of the reference white, the complementary stream includes at least one of subtitle information or graphics information, and the at least one of the subtitle information or the graphics information is associated with the encoded stream.

15. The image processing apparatus according to claim 1, wherein the image signals include an encoded stream, the encoded stream is encoded in conformity with a high efficiency video coding (HEVC) scheme, the HLG scheme for the image signals is further based on a third parameter, and video usability information (VUI) associated with the encoded stream includes the third parameter.

16. A method, comprising:

transforming image signals into display signals based on gamma transformation of the image signals, wherein a value of a display luminance level of a reference white is constant based on a first parameter, the first parameter is based on a peak luminance level of a display element, the image signals are based on a hybrid log gamma (HLG) scheme that includes a fixedly handling process of the display luminance level of the reference white, the HLG scheme is based on a combination of a gamma curve at a luminance level lower than the display luminance level of the reference white, and a logarithmic curve at a luminance level higher than the display luminance level of the reference white.

* * * * *